US012712684B2

(12) United States Patent
Xu et al.

(10) Patent No.: US 12,712,684 B2
(45) Date of Patent: Aug. 18, 2026

(54) SATELLITE COMMUNICATION METHOD AND RELATED COMMUNICATION DEVICE

(71) Applicant: HUAWEI TECHNOLOGIES CO., LTD., Shenzhen (CN)

(72) Inventors: Chenlei Xu, Hangzhou (CN); Hejia Luo, Hangzhou (CN); Jianwei Zhou, Hangzhou (CN); Xiaolu Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1027 days.

(21) Appl. No.: 17/707,815

(22) Filed: Mar. 29, 2022

(65) Prior Publication Data

US 2022/0224463 A1 Jul. 14, 2022

Related U.S. Application Data

(63) Continuation of application No. PCT/CN2020/119184, filed on Sep. 30, 2020.

(30) Foreign Application Priority Data

Sep. 30, 2019 (CN) ......................... 201910944848.2

(51) Int. Cl.
*H04L 5/00* (2006.01)
*H04W 74/00* (2009.01)
(Continued)

(52) U.S. Cl.
CPC ......... *H04L 5/0021* (2013.01); *H04W 74/006* (2013.01); *H04W 74/0833* (2013.01); *H04W 84/06* (2013.01)

(58) Field of Classification Search
CPC ............ H04B 7/18513; H04L 27/2613; H04L 5/0021; H04W 74/006; H04W 74/0833; H04W 84/06; H04W 74/002
See application file for complete search history.

(56) References Cited

U.S. PATENT DOCUMENTS

2019/0190762 A1 6/2019 Lee et al.
2020/0059390 A1* 2/2020 Zhang .................. H04L 5/0092
(Continued)

FOREIGN PATENT DOCUMENTS

CN 101789916 A 7/2010
CN 102036408 A 4/2011
(Continued)

OTHER PUBLICATIONS

Ding et al., "Research on Random Access Preamble Design and Detection Algorithm for LEO LTE Satellites," Telecommunication Engineering, vol. 58, No. 10, Oct. 2018, 1 page (English Abstract).
(Continued)

*Primary Examiner* — Liton Miah
(74) *Attorney, Agent, or Firm* — Fish & Richardson P.C.

(57) ABSTRACT

Example satellite communication methods and example related devices are provided. One example satellite communication method includes generating a random access preamble sequence, where the random access preamble sequence includes a cyclic prefix, a sequence part, and a guard interval, the sequence part is obtained by performing frequency domain resource mapping and time-frequency transformation on a frequency domain sequence, and the frequency domain sequence is obtained based on a Zadoff-Chu (ZC) sequence and a mask sequence. The random access preamble sequence can then be output.

18 Claims, 16 Drawing Sheets

(51) Int. Cl.

| | |
|---|---|
| ***H04W 74/08*** | (2024.01) |
| ***H04W 74/0833*** | (2024.01) |
| *H04W 84/06* | (2009.01) |

(56) References Cited

U.S. PATENT DOCUMENTS

| | | | | |
|---|---|---|---|---|
| 2020/0068617 A1* | 2/2020 | Yoon | .................. | H04W 74/006 |
| 2020/0266908 A1* | 8/2020 | Qian | ..................... | H04L 5/0094 |
| 2020/0404601 A1* | 12/2020 | Lin | ....................... | H04L 1/0072 |
| 2021/0376946 A1* | 12/2021 | Zhang | ................ | H04J 13/0062 |

FOREIGN PATENT DOCUMENTS

| | | |
|---|---|---|
| CN | 103166894 A | 6/2013 |
| CN | 109392155 A | 2/2019 |
| CN | 110111285 A | 8/2019 |
| CN | 110113285 A | 8/2019 |

OTHER PUBLICATIONS

Ericsson, "Initial access signals and channels," 3GPP TSG-RAN WG1 Meeting #97, R1-1907451, Reno, USA, May 13-17, 2019, 11 pages.

Huawei, HiSilicon, "Discussion on Doppler compensation, timing advance and RACH for NTN," 3GPP TSG RAN WG1 Meeting #99, R1-1911860, Reno, USA, Nov. 18-22, 2019, 14 pages.

Huawei, HiSilicon, CAICT, "Discussion on Doppler compensation, timing advance and RACH for NTN," 3GPP TSG RAN WG1 Meeting #98, R1-1908049, Prague, Czech Republic, Aug. 26-30, 2019, 36 pages.

Nokia, Nokia Shanghai Bell, "Considerations on Doppler Compensation, Uplink Timing Advance and Random Access in NTN," 3GPP TSG RAN WG1 Meeting #98, R1-1908250, Prague, Czech Republic, Aug. 26-30, 2019, 21 pages.

Office Action issued in Chinese Application No. 201910944848.2 on Jun. 1, 2022, 11 pages.

PCT International Search Report and Written Opinion issued in International Application No. PCT/CN2020/119184 on Dec. 30, 2020, 16 pages (with English translation).

Extended European Search Report issued in European Application No. 20870531.9 on Nov. 2, 2022, 8 pages.

Huawei, HiSilicon, "RACH Preamble Design for NR," 3GPP TSG RAN WG1 Meeting #88, R1-1701709, Athens, Greece, Feb. 13-17, 2017, 16 pages.

Qualcomm Incorporated, "Remaining Details on PRACH Formats," 3GPP TSG RAN WG1 Meeting #91, R1-17120652, Reno, USA, Nov. 27-Dec. 2, 2017, 21 pages.

* cited by examiner

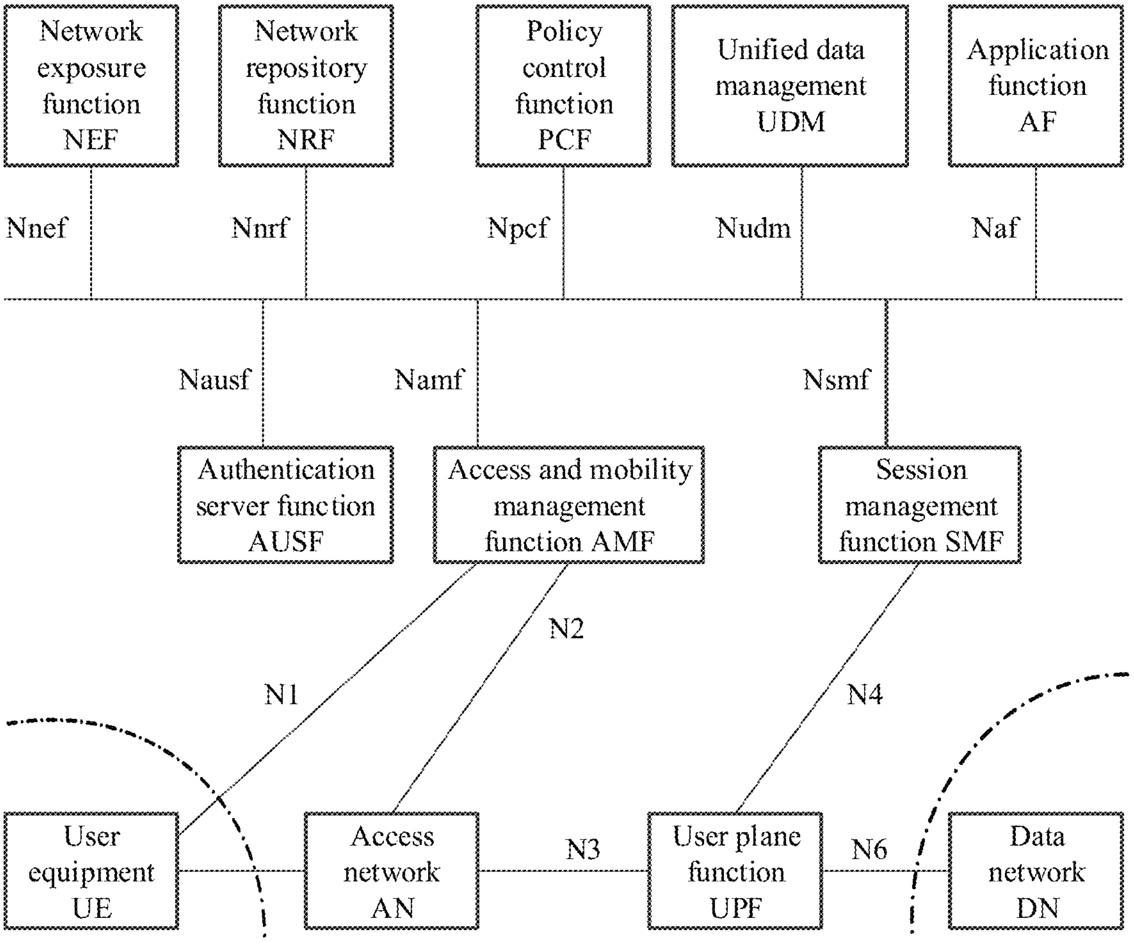
FIG. 1-A

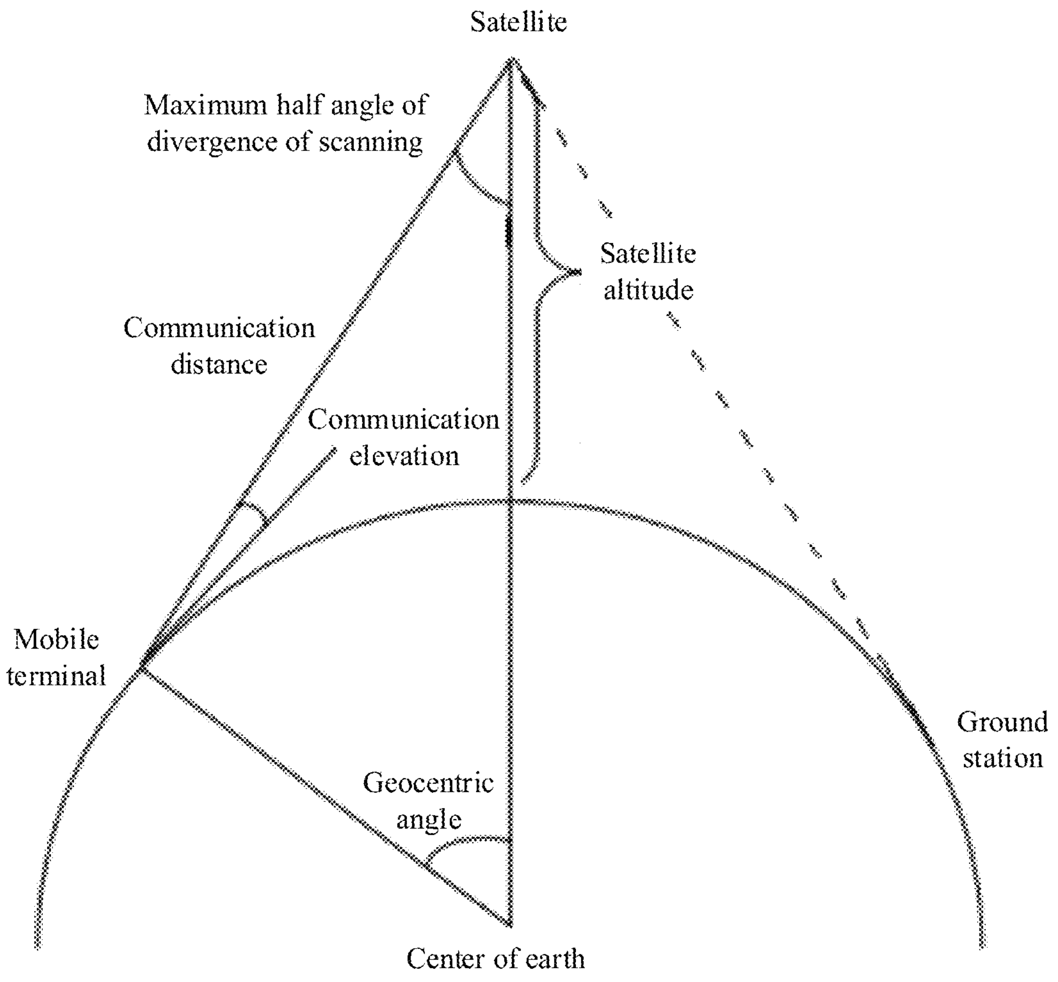
FIG. 1-B

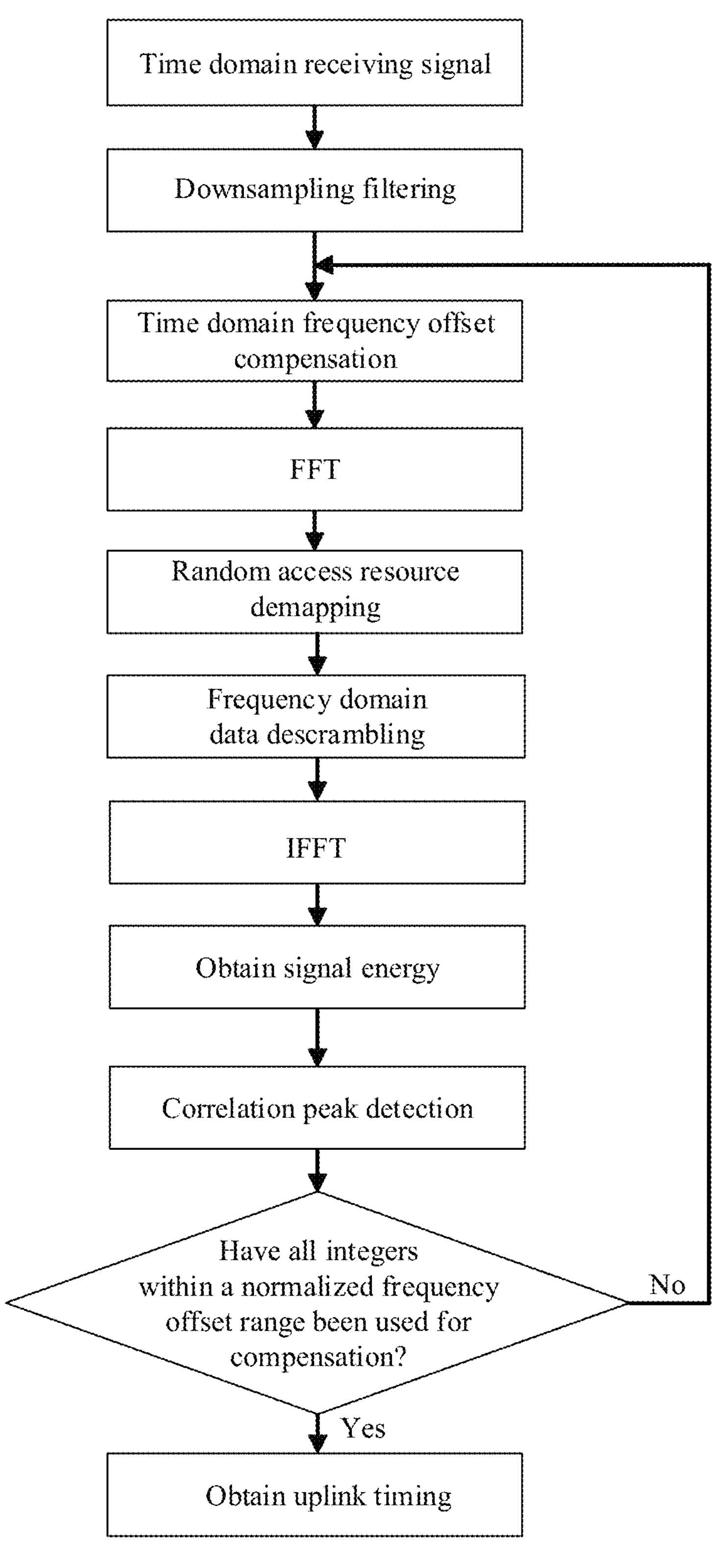
FIG. 4-A

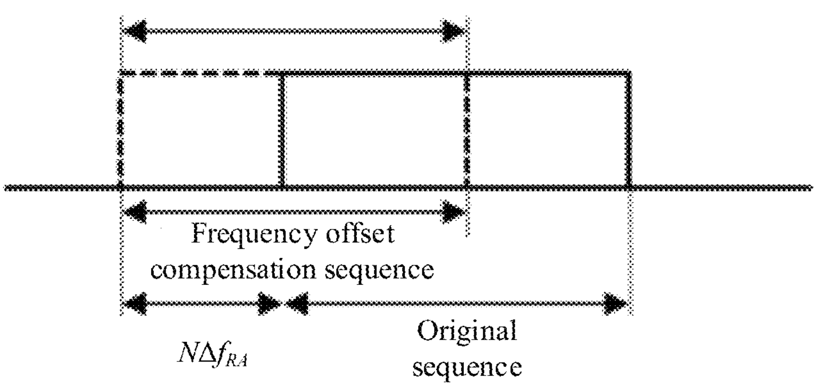
FIG. 4-B

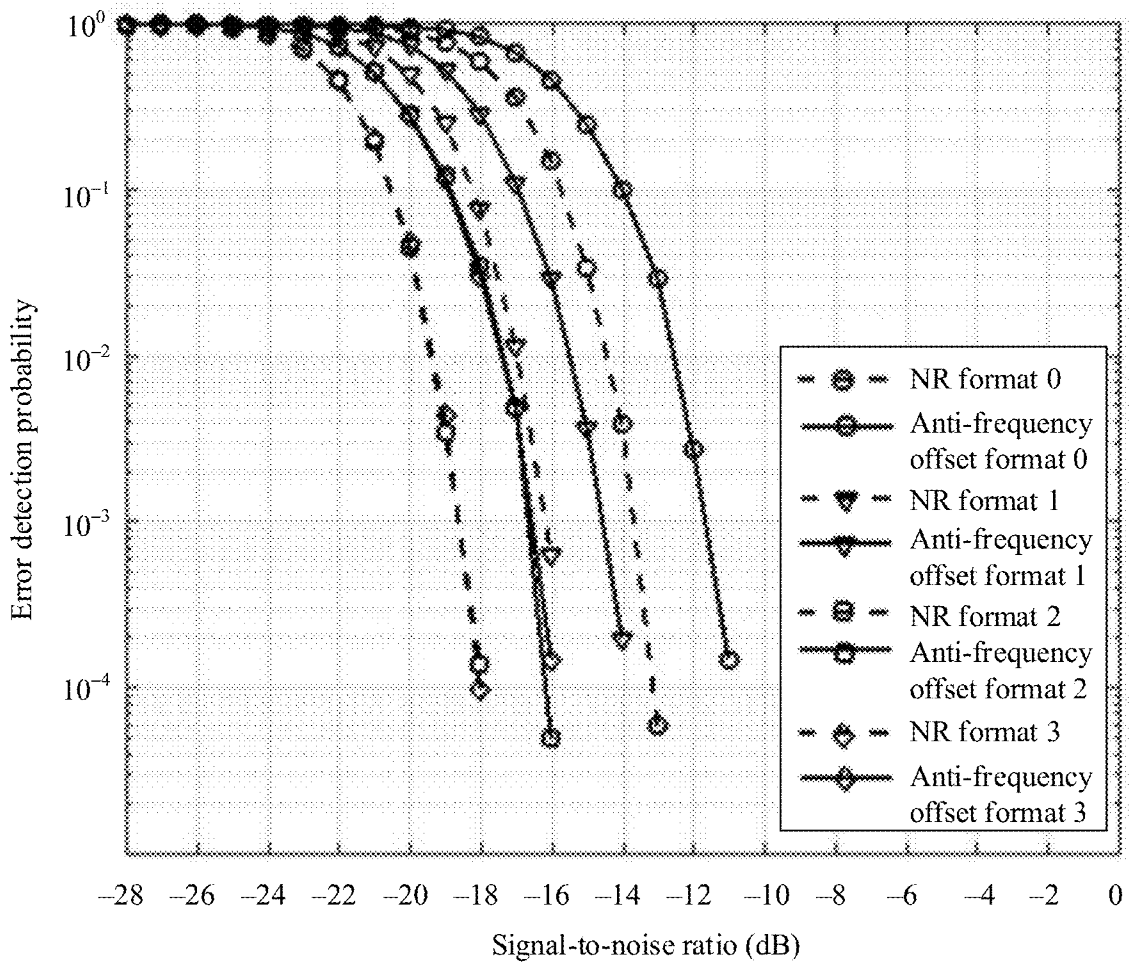
FIG. 4-C

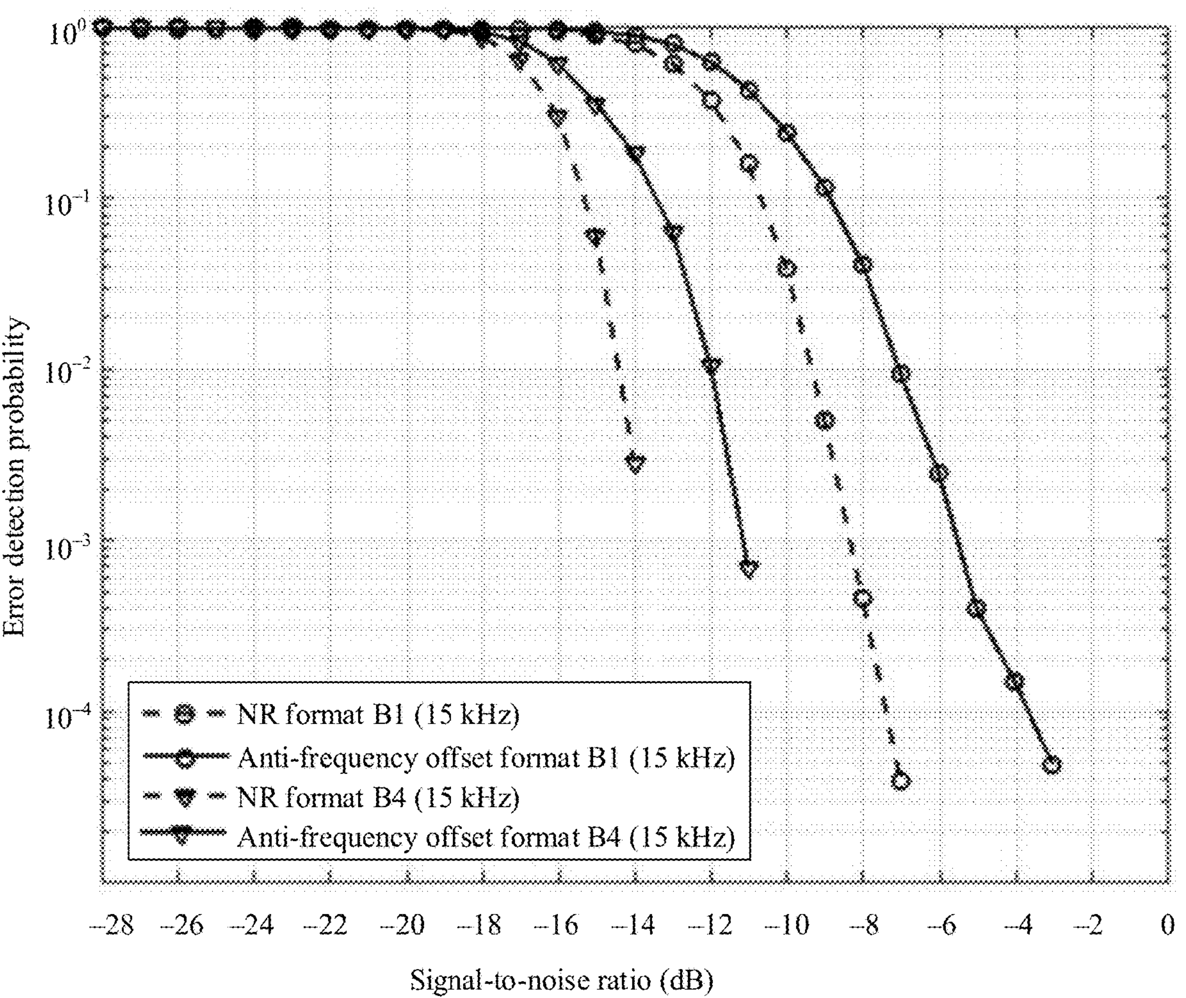
FIG. 4-D

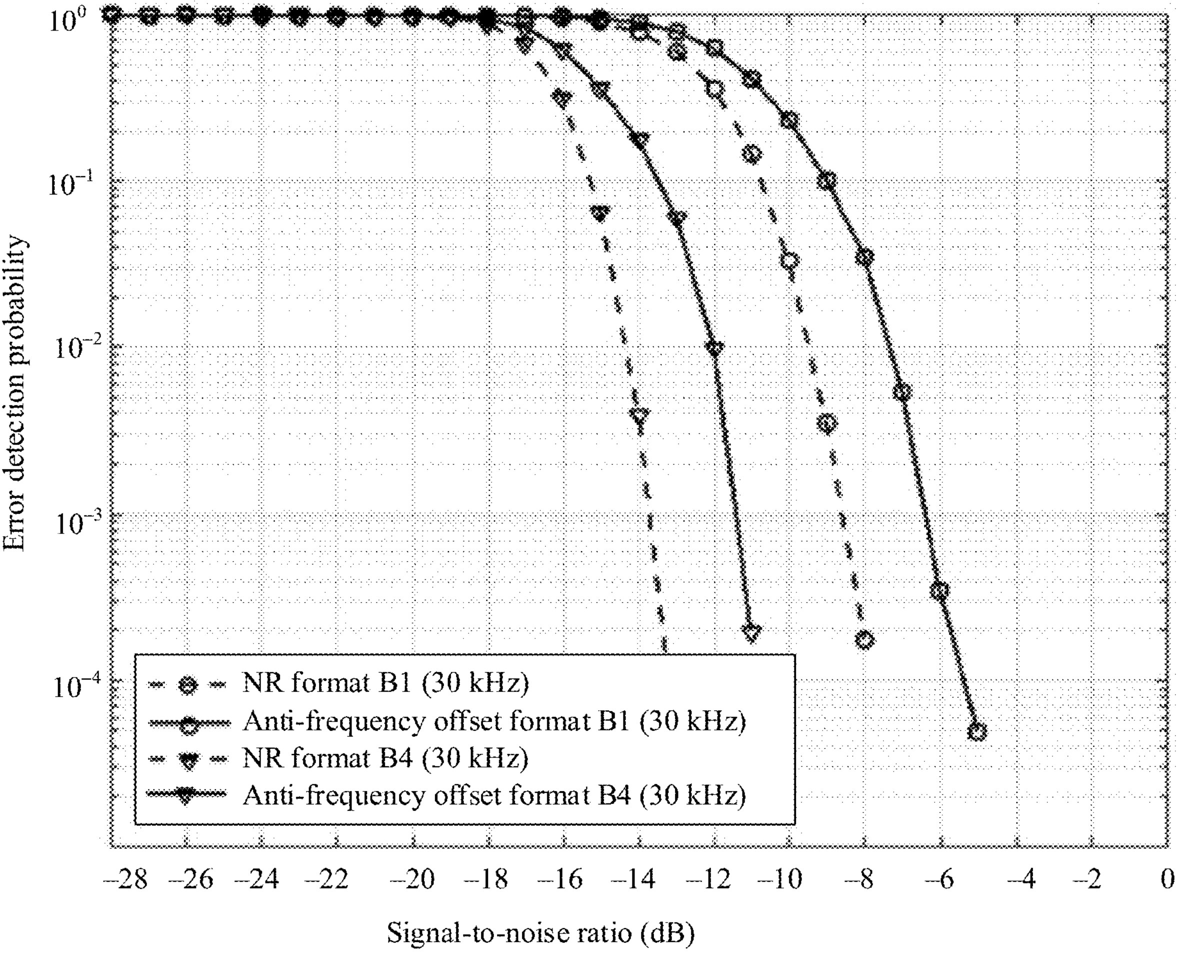
FIG. 4-E

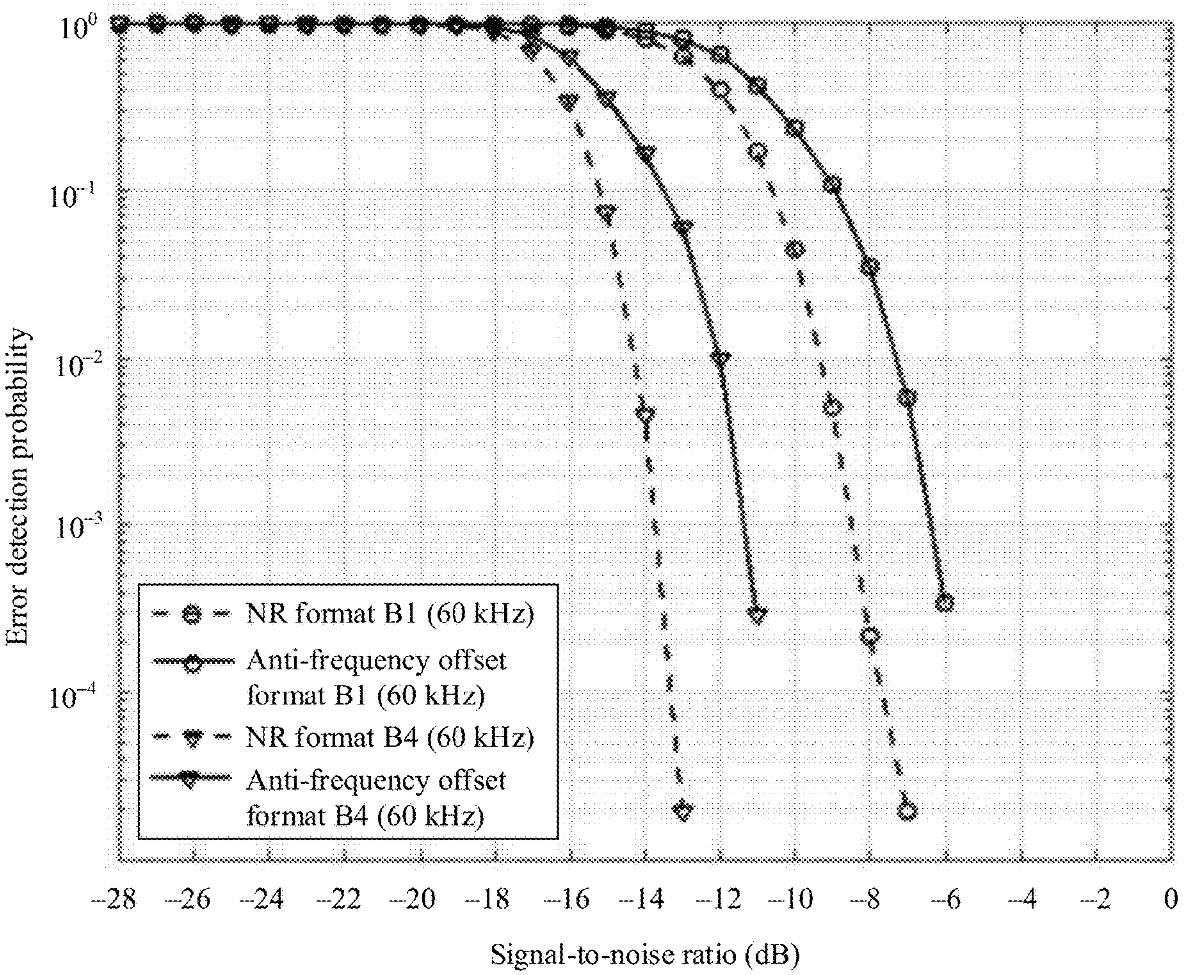
FIG. 4-F

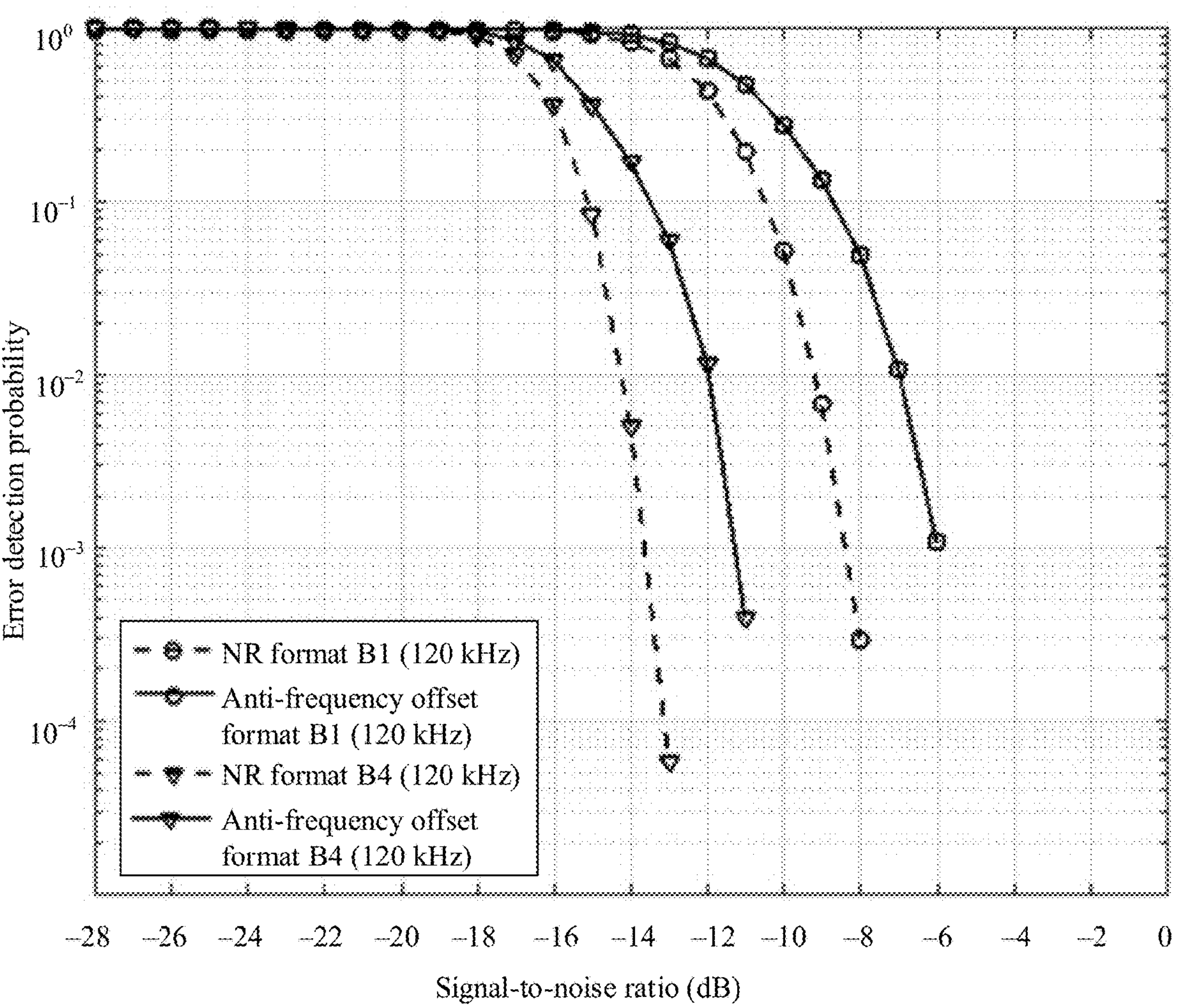
FIG. 4-G

| Index number | Indication form |
|---|---|
| 0 | A mask is separately added to a real part and an imaginary part of frequency domain data |
| 1 | A mask is added to a whole piece of frequency domain data |
| … | … |
| n | A mask is added to n pieces of frequency domain data as a whole |
FIG. 4-H
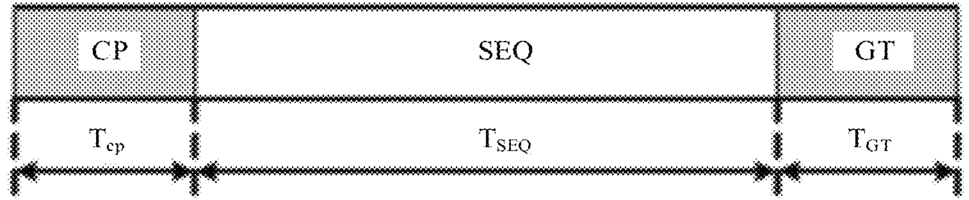
FIG. 5-A
FIG. 5-B
CP A B A B ... GT
FIG. 5-C
CP A CP B GT
FIG. 5-D
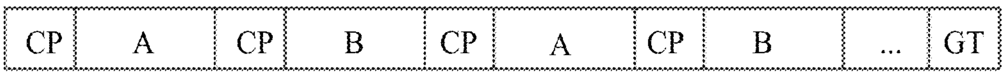
FIG. 5-E

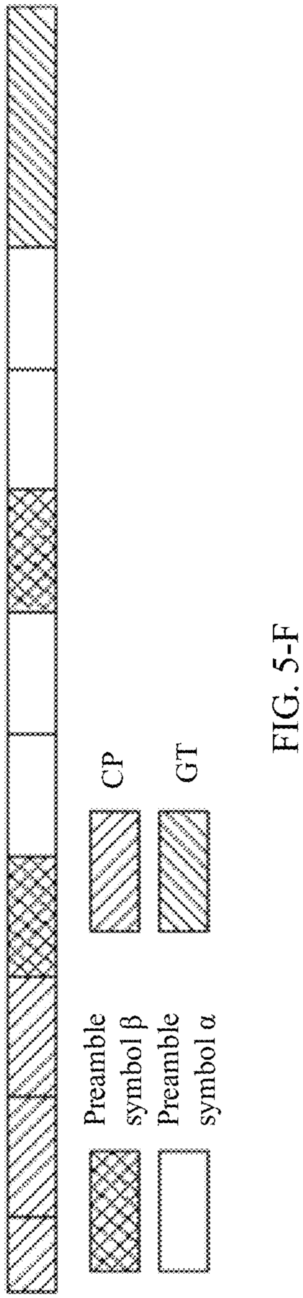
FIG. 5-F

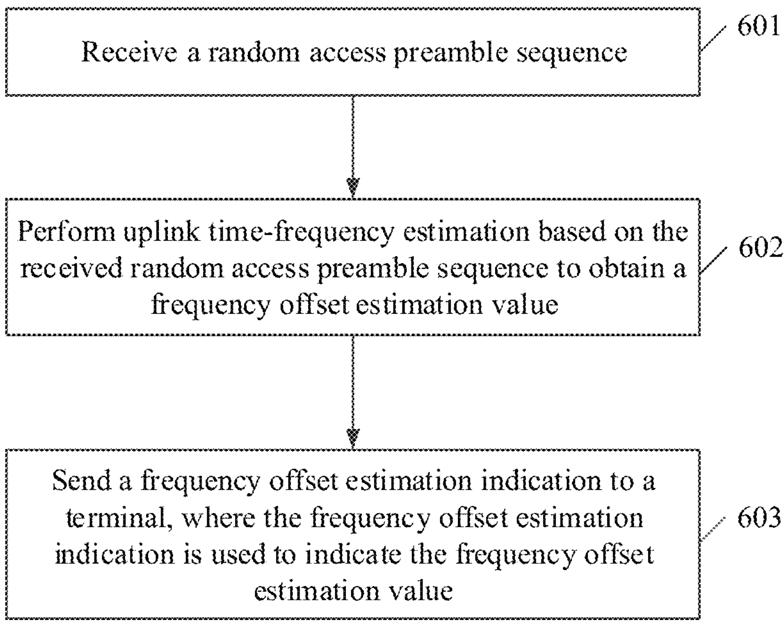
FIG. 6-A

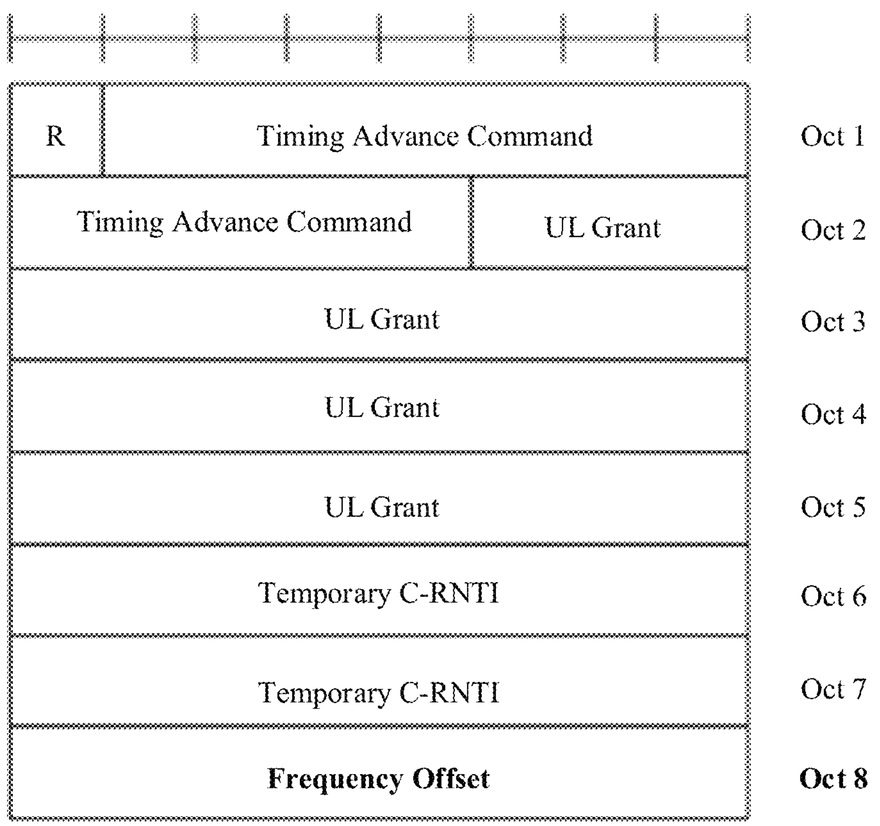
FIG. 6-B
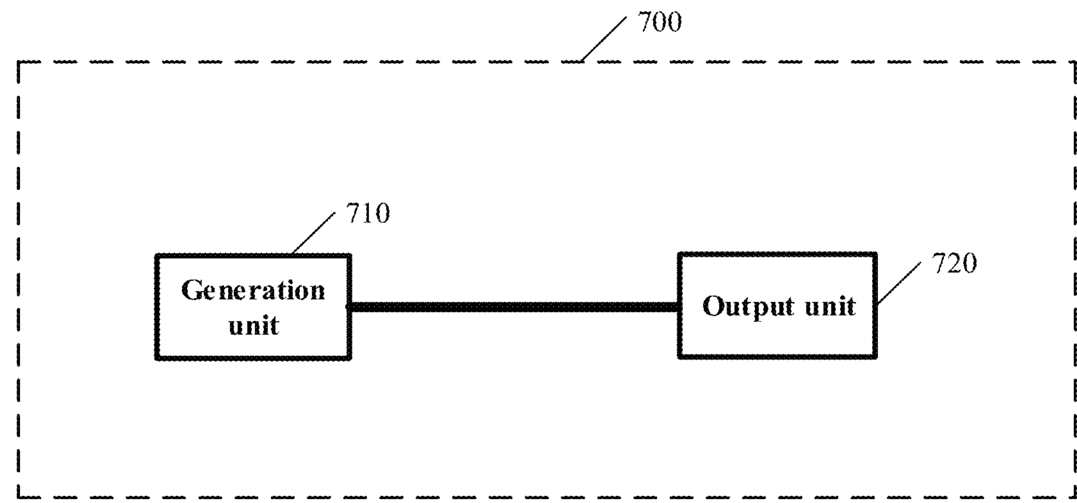
FIG. 7

900
920
Memory
Processor
910

SATELLITE COMMUNICATION METHOD AND RELATED COMMUNICATION DEVICE

CROSS-REFERENCE TO RELATED APPLICATIONS

This application is a continuation of International Patent Application No. PCT/CN2020/119184, filed on Sep. 30, 2020, which claims priority to Chinese Patent Application No. 201910944848.2, filed on Sep. 30, 2019. The disclosures of the aforementioned applications are hereby incorporated by reference in their entireties.

TECHNICAL FIELD

This application relates to the field of communication technologies, and in particular, to a satellite communication method and a related communication device.

BACKGROUND

Satellite communication has significant advantages such as global coverage, long-distance transmission, flexible networking, convenient deployment, and freedom from a geographical condition. Therefore, satellite communication has been widely applied to a plurality of fields such as maritime communication, positioning and navigation, disaster relief against risks, scientific experiments, video broadcasting, and earth observation.

In the future, the fifth-generation ground mobile network (5G) will have a complete industry chain, a large user group, a flexible and efficient application service mode, and the like. Therefore, an important direction for communication development in the future is as follows: A satellite communication system and the 5G network are mutually integrated and learn from each other, to jointly form an integrated sea, land, air, and space communication network that seamlessly covers the world, so as to meet a plurality of ubiquitous service requirements of users.

The satellite communication system uses a non-geostationary earth orbit (NGEO) satellite. Based on orbital heights of the satellite, satellite mobile communication system may be classified into geostationary earth orbit (GEO) systems, medium earth orbit (MEO) satellite communication systems, and low earth orbit (LEO) satellite communication systems.

Regardless of a ground cellular mobile communication system or a satellite mobile communication system, a carrier frequency offset greatly deteriorates operating performance of the communication system. A main source of the carrier frequency offset is: an error between frequencies of crystal oscillators used at a transmit end and a receive end of the communication system and a Doppler frequency offset of a wireless channel.

For the ground cellular mobile communication system, the carrier frequency offset mainly comes from a crystal oscillator error. In a high-speed mobile communication scenario such as a high-speed train or an airplane, the Doppler frequency offset is also an important part of the carrier frequency offset. For the satellite mobile communication system, especially a low earth orbit satellite mobile communication system, in addition to the carrier frequency offset caused by the crystal oscillator error, a large Doppler frequency offset further exists in a satellite-to-ground link.

However, certainly, a mature and reliable related solution that may be used to better resolve the carrier frequency offset in the satellite mobile communication system has not been designed in the industry.

SUMMARY

Embodiments of this application provide a satellite communication method and a related communication device.

According to a first aspect, an embodiment of this application provides a satellite communication method, including:

generating a random access preamble sequence, where the random access preamble sequence includes a cyclic prefix, a sequence part, and a guard interval, the sequence part is obtained by performing frequency domain resource mapping and time-frequency transformation on a frequency domain sequence, and the frequency domain sequence is obtained based on a ZC sequence and a mask sequence; and outputting the random access preamble sequence.

For example, $$x_{u,v}(n) = x_u((n + C_v) \bmod N_{zc})$$

$$x_u(i) = e^{-j\frac{\pi u i(i+1)}{N_{zc}}},\ 0 \le i \le N_{zc} - 1,$$

where u is a root index of the ZC sequence, $x_u(i)$ represents one piece of data in an original ZC sequence, $N_{zc}$ is a length of the ZC sequence, $x_{u,v}(n)$ represents a piece of data in a ZC sequence on which cyclic shift processing is performed, and $C_v$ is a cyclic shift; and $$\tilde{y}_{u,v}(n) = y_{u,v}(n) \cdot c(n),\ 0 \le n \le N_{zc} - 1$$

$$y_{u,v}(n) = \sum_{m=0}^{N_{ZC}-1} x_{u,v}(m) \cdot e^{-j\frac{2\pi mn}{N_{ZC}}},$$

where c(n) is an element in the mask sequence, and $\tilde{y}_{u,v}(n)$ represents one piece of data in the frequency domain sequence.

For example, the mask sequence is an m sequence, an M sequence, or a Gold sequence, where elements in the mask sequence are 1 and −1 or scaled values of 1 and −1.

For example, the mask sequence is a mask sequence common to an entire network, the mask sequence is a mask sequence that is of the random access preamble sequence and that is agreed upon by all base stations and terminals, and all the base stations and terminals use a mask sequence including a same element.

Alternatively, the mask sequence is a mask sequence common to a cell or satellite beam, generation of the mask sequence is related to at least one specific parameter of the cell or satellite beam, and the specific parameter of the cell or satellite beam includes one or more of the following parameters: an index number of the cell or satellite beam, an index number of a data subcarrier width, an index number of a synchronization signal block, or an index number of a bandwidth part.

Alternatively, the mask sequence is a sequence related to a random access time-frequency resource, generation of the mask sequence is related to at least one related parameter of the random access time-frequency resource, and the parameter of the random access time-frequency resource includes one or more of the following parameters: a start symbol, a start slot number, a frequency domain resource number, or an uplink carrier number of the time-frequency resource.

For example, the sequence part includes at least one subsequence A. In addition, the sequence part may further include at least one subsequence B. The subsequence A includes at least one preamble symbol, the subsequence B includes at least one preamble symbol, and the preamble symbol included in the subsequence A is different from the preamble symbol included in the subsequence B; and the subsequence A is obtained by performing frequency domain resource mapping and time-frequency transformation on a frequency domain sequence Za, and the frequency domain sequence Za is obtained based on the ZC sequence and the mask sequence.

For example, when lengths of all subsequences A are equal and lengths of all subsequences B are equal, an interval between any two adjacent subsequences B is at least greater than or equal to $$\lceil N_{CP}^{i} + N_{CP}^{f} \rceil, \lceil \bullet \rceil$$

represents rounding up, $$N_{CP}^{i}$$

represents an integral quantity of preamble symbols included in the cyclic prefix, and $$N_{CP}^{f}$$

represents a fractional quantity of preamble symbols included in the cyclic prefix.

For example, a length of each subsequence A and a length of each subsequence B are separately greater than or equal to a length of the cyclic prefix.

For example, the random access preamble sequence includes one cyclic prefix.

The subsequence A and the subsequence B are located between the cyclic prefix and the guard interval, or a time domain superimposed sequence of the subsequence A and the subsequence B is located between the cyclic prefix and the guard interval.

For example, the random access preamble sequence includes a first cyclic prefix and a second cyclic prefix.

The at least one subsequence A is located between the first cyclic prefix and the second cyclic prefix, and the at least one subsequence B is located between the second cyclic prefix and the guard interval.

Alternatively, the at least one subsequence B is located between the first cyclic prefix and the second cyclic prefix, and the at least one subsequence A is located between the second cyclic prefix and the guard interval.

Alternatively, the at least one subsequence A and the at least one subsequence B alternately occur between the first cyclic prefix and the second cyclic prefix.

According to a second aspect, an embodiment of this application provides a satellite communication device, including:

a sending unit, configured to generate a random access preamble sequence, where the random access preamble sequence includes a cyclic prefix, a sequence part, and a guard interval, the sequence part is obtained by performing frequency domain resource mapping and time-frequency transformation on a frequency domain sequence, and the frequency domain sequence is obtained based on a ZC sequence and a mask sequence; and an output unit, configured to output the random access preamble sequence.

According to a third aspect, an embodiment of this application provides a satellite communication method, including:

receiving a random access preamble sequence, where the random access preamble sequence includes a cyclic prefix, a sequence part, and a guard interval, the sequence part is obtained by performing frequency domain resource mapping and time-frequency transformation on a frequency domain sequence, and the frequency domain sequence is obtained based on a ZC sequence and a mask sequence;

performing uplink time-frequency estimation based on the received random access preamble sequence to obtain a frequency offset estimation value $\Delta\hat{f}_2$, where $\Delta\hat{f}_2$ includes a frequency offset caused by a crystal oscillator error and/or a Doppler frequency offset; and sending a frequency offset estimation indication to a terminal, where the frequency offset estimation indication is used to indicate the frequency offset estimation value $\Delta\hat{f}_2$.

For example, the frequency offset estimation indication is carried in a frequency offset estimation value feedback field of a media access control random access response MAC RAR; or the frequency offset estimation indication is carried in a random access radio network temporary identifier RA-RNTI.

According to a fourth aspect, an embodiment of this application provides a satellite communication device, including:

a communication unit, configured to receive a random access preamble sequence, where the random access preamble sequence includes a cyclic prefix, a sequence part, and a guard interval, the sequence part is obtained by performing frequency domain resource mapping and time-frequency transformation on a frequency domain sequence, and the frequency domain sequence is obtained based on a ZC sequence and a mask sequence; and a detection unit, configured to perform uplink time-frequency estimation based on the received random access preamble sequence to obtain a frequency offset estimation value $\Delta\hat{f}_2$, where $\Delta\hat{f}_2$ includes a frequency offset caused by a crystal oscillator error and/or a Doppler frequency offset.

The communication unit is further configured to send a frequency offset estimation indication to a terminal, where the frequency offset estimation indication is used to indicate the frequency offset estimation value $\Delta\hat{f}_2$.

For example, the frequency offset estimation indication is carried in a frequency offset estimation value feedback field of a media access control random access response MAC RAR; or the frequency offset estimation indication is carried in a random access radio network temporary identifier RA-RNTI.

According to a fifth aspect, an embodiment of this application further provides a satellite communication device, including a processor and a memory that are coupled to each other.

The processor is configured to invoke a computer program stored in the memory, to perform some or all of the steps of any method in the first aspect or the third aspect.

According to a sixth aspect, an embodiment of this application further provides a computer-readable storage medium, where the computer-readable storage medium stores a computer program, and the computer program is executed by a processor, to complete some or all of the steps of the methods in the foregoing aspects.

According to a seventh aspect, an embodiment of this application further provides a computer program product including instructions. When the computer program product is run on a user equipment, a satellite communication device is enabled to perform some or all of the steps of the methods in the foregoing aspects.

According to an eighth aspect, an embodiment of this application further provides a communication apparatus, including: at least one input end, a signal processor, and at least one output end, where the signal processor is configured to perform some or all of the steps of any method in the foregoing aspects.

According to a ninth aspect, an embodiment of this application further provides a communication apparatus, including an input interface circuit, a logic circuit, and an output interface circuit, where the logic circuit is configured to perform some or all of the steps of any method in the foregoing aspects.

BRIEF DESCRIPTION OF DRAWINGS

The following describes some accompanying drawings in embodiments of this application.

FIG. 1-A is a schematic diagram of an architecture of communication system according to an embodiment of this application;

FIG. 1-B is a schematic diagram of a satellite communication scenario according to an embodiment of this application;

FIG. 4-A and FIG. 4-B are schematic diagrams of a mask recovery method according to an embodiment of this application;

FIG. 4-C to FIG. 4-F are several schematic diagrams of detection performance of a random access preamble sequence according to an embodiment of this application;

FIG. 4-G is a schematic diagram of an indication mapping table according to an embodiment of this application;

FIG. 4-H is a schematic diagram of an indication form index table according to an embodiment of this application;

FIG. 5-A to FIG. 5-F are schematic diagrams of formats of a random access preamble sequence according to an embodiment of this application;

FIG. 6-A is another schematic flowchart of a satellite communication method according to an embodiment of this application;

FIG. 6-B is a schematic diagram of a message format according to an embodiment of this application;

FIG. 7 is a schematic diagram of a structure of a satellite communication device according to an embodiment of this application;

DESCRIPTION OF EMBODIMENTS

Figure 2:
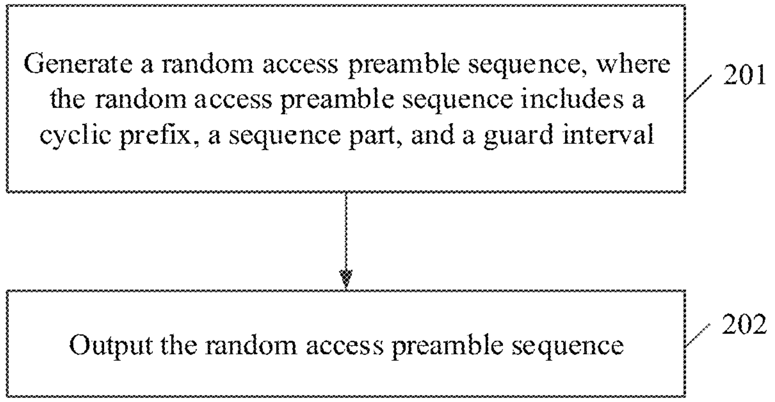
FIG. 2 is a schematic flowchart of a satellite communication method according to an embodiment of this application.

The following describes embodiments of this application with reference to the accompanying drawings in embodiments of this application.

FIG. 1-A is a schematic diagram of an example of a 5G network architecture according to an embodiment of this application. In a 5G network, some function network elements (for example, a mobility management entity (MME)) in a 4G network are split, and a service-based architecture is defined. In the network architecture shown in FIG. 1-A, a function similar to that of the MME in the 4G network is split into an access and mobility management function (AMF), a session management function (SMF), and the like.

The following describes some other related network elements/entities.

User equipment (UE) accesses a data network (DN) or the like by accessing an operator network, and uses a service provided by an operator or a third party on the DN.

For ease of description, in the embodiments of this application, the user terminal, the user equipment, a terminal device, or a terminal may be collectively referred to as UE. That is, without special description, the UE described hereinafter in the embodiments of this application may be replaced with the user terminal, the user equipment, the terminal device, or the terminal. Certainly, the user terminal, the user equipment, the terminal device, or the terminal may also be interchanged.

An access and mobility management function (AMF) is a control-plane function in a 3GPP network, and is mainly responsible for access control and mobility management when the UE accesses the operator network. A security anchor function (SEAF) may be deployed in the AMF, or deployed in another device different from the AMF. In FIG. 1-A, an example in which the SEAF is deployed in the AMF is used. When the SEAF is deployed in the AMF, the SEAF and the AMF may be jointly referred to as an AMF.

A session management function (SMF) is a control-plane function in the 3GPP network, and is mainly responsible for managing a packet data unit (Packet Data Unit, PDU) session of the UE. The PDU session is a channel used to transmit a PDU, and the UE and the DN may send a PDU to each other by using the PDU session. The SMF is responsible for management tasks such as establishment, maintenance, and deletion of the PDU session.

The DN, also referred to as a packet data network (PDN), is a network located outside the 3GPP network. A plurality of DNs may be connected to the 3GPP network, and a plurality of services provided by an operator or a third party may be deployed in the DN. For example, a DN is a private network of a smart factory, a sensor installed in a workshop of the smart factory plays a role of the UE, and a control server of the sensor is deployed in the DN. The UE communicates with the control server. After obtaining an instruction from the control server, the UE may transfer collected data to the control server according to the instruction. For another example, a DN is an internal office network of a company, a terminal used by an employee of the company may play a role of UE, and the UE may access internal information and other resources of the company.

A unified data management (UDM) is also a control-plane function in the 3GPP network. The UDM is mainly responsible for storing subscription data, a credential, a permanent identifier (Subscriber Permanent Identifier, SUPI), and the like of a subscriber (UE) in the 3GPP network. The data may be used for authentication and authorization when the UE accesses a 3GPP network of an operator.

An authentication server function (AUSF) is also a control-plane function in the 3GPP network. The AUSF is mainly used for first-level authentication (namely, subscriber authentication in the 3GPP network).

A network exposure function (NEF) is also a control-plane function in the 3GPP network. The NEF is mainly responsible for exhibiting an external interface of the 3GPP network to a third party in a secure manner. When a function, for example, the SMF, needs to communicate with a third party network element, the NEF may serve as a relay for communication. The NEF can translate internal and external identifiers when serving as the relay. For example, when sending an SUPI of the UE from the 3GPP network to a third party, the NEF may translate the SUPI into a corresponding external identity (ID). Conversely, when sending an external identity ID to the 3GPP network, the NEF may translate the external identity ID into a corresponding SUPI.

A network repository function (NRF) is also a control-plane function in the 3GPP network. The NR is mainly responsible for storing a configuration service profile (profile) of an accessible network function (NF), and providing a network function discovery service for another network element.

A user plane function (UPF) is a gateway for communication between the 3GPP network and the DN.

A policy control function (PCF) is a control-plane function in the 3GPP network, and is configured to provide a policy of a PDU session for the SMF. The policy may include charging, quality of service (QoS), an authorization-related policy, and the like.

An access network (AN) is a sub-network of the 3GPP network. To access the 3GPP network, the UE needs to first access the AN. In a radio access scenario, the AN is also referred to as a radio access network (RAN). Therefore, terms "RAN" and "AN" are usually used interchangeably.

The 3GPP network is a network that complies with 3GPP specifications. In FIG. 1-A, parts other than the UE and the DN may be considered as the 3GPP network. The 3GPP network is not limited to a 5G network defined by the 3GPP, but may further include a 2G network, a 3G network, and a 4G network. Usually, the 3GPP network is operated by an operator. In addition, N1, N2, N3, N4, N6, and the like in the architecture shown in FIG. 1-A represent reference points between related entities/network functions. Nausf, Namf, and the like represent service-oriented interfaces of related network functions.

Certainly, the 3GPP network and a non-3GPP network may coexist, and some network elements in the 5G network may also be used in some non-5G networks.

In the future, the ground 5G will have a complete industry chain, a large user group, a flexible and efficient application service mode, and the like. Therefore, an important direction for communication development in the future is as follows: A satellite communication system and the 5G network are mutually integrated and learn from each other, to jointly form an integrated sea, land, air, and space communication network that seamlessly covers the world, so as to meet a plurality of ubiquitous service requirements of users.

FIG. 1-B is a schematic diagram of an example of a satellite communication scenario. For a communication scenario in which a satellite has a signal processing capability or a satellite transparently forwards a user signal to a ground base station to implement wide-area coverage, a protocol stack compatible with a 3GPP LTE/NR protocol may be used. The user terminal is a common mobile terminal or a dedicated terminal, and a transmission process also follows the LTE/NR protocol. Solutions discussed in this application are also applicable to a ground mobile communication scenario defined in 3GPP LTE/NR, and are more applicable to a high-speed mobile communication scenario such as a high-speed train or an airplane.

The following briefly describes the satellite communication scenario.

For an asynchronous satellite mobile communication system, especially a low earth orbit satellite mobile communication system, a running speed of the satellite is relatively fast, which makes a signal produce a large-scale fast time-varying Doppler frequency offset in a transmission process. It is found that, in the satellite mobile communication system, main factors that cause a time-frequency synchronization problem are a large Doppler frequency offset and a frequency offset caused by a crystal oscillator error. However, a conventional time-frequency estimation algorithm can estimate a superimposed value of only two frequency offsets in downlink synchronization, namely, $f_d+f_e$, where $f_d$ represents a Doppler frequency offset, and $f_e$ represents a frequency offset caused by a crystal oscillator error. Because a generation principle of the Doppler frequency offset is different from a generation principle of the frequency offset introduced by the crystal oscillator error, a reasonable frequency offset compensation manner should be that the terminal side compensates $-f_d+f_e$ for a sent uplink signal, that is, a negative compensation manner is used for the Doppler frequency offset, and a positive compensation manner is used for the frequency offset caused by the crystal oscillator error. If the user terminal directly uses a frequency offset estimation result of downlink synchronization to perform frequency offset compensation on an uplink transmission signal, a frequency offset $2f_e$ (negative compensation) or $2f_d$ (positive compensation) is introduced into the uplink signal.

For example, in a satellite communication scenario, a satellite orbital height of a low earth orbit satellite communication system is 600 km. A satellite base station uses a Doppler frequency offset at a beam center as a pre-compensation value, to compensate for some of Doppler frequency offsets in downlink data. Based on parameters provided in a 3GPP conference document, in this system, a residual Doppler frequency offset of a terminal at an edge of an under-satellite beam whose radius is 200 km is 4.14 ppm, a crystal oscillator error of the terminal is 5 ppm, and a crystal oscillator error of the satellite base station is ignored. After the user terminal obtains a frequency offset estimation value, if the positive compensation manner is used, a maximum uplink residual frequency offset is about 8.3 ppm, that is, a residual frequency offset is 16.6 kHz when a carrier is 2

GHz, and the residual frequency offset is 249 kHz when the carrier is 30 GHz; or if the negative compensation manner is used, a maximum uplink residual frequency offset is about 10 ppm, that is, a residual frequency offset is 20 kHz when a carrier is 2 GHz, and the residual frequency offset is 300 kHz when the carrier is 30 GHz. It can be learned that the uplink residual frequency offset of the satellite mobile communication system is much greater than an uplink residual frequency offset of a ground communication system. However, a relatively large residual frequency offset has a serious impact on a random access preamble sequence specified in the LTE/NR protocol, resulting in degradation of uplink synchronization performance of the random access preamble sequence, and even a complete failure of an uplink synchronization function of the random access preamble sequence.

A random access preamble sequence provided in the embodiments of this application includes a cyclic prefix, a sequence part, and a guard interval, where the sequence part is obtained by performing frequency domain resource mapping and time-frequency transformation on a frequency domain sequence, and the frequency domain sequence is obtained based on a Zadoff-Chu (ZC) sequence and a mask sequence.

FIG. 2 is a schematic flowchart of an example of a satellite communication method according to an embodiment of this application. The satellite communication method may include the following steps.

201: Generate a random access preamble sequence, where the random access preamble sequence includes a cyclic prefix, a sequence part, and a guard interval, the sequence part is obtained by performing frequency domain resource mapping and time-frequency transformation on a frequency domain sequence, and the frequency domain sequence is obtained based on a ZC sequence and a mask sequence.

202: Output the random access preamble sequence.

Specifically, $$x_{u,v}(n) = x_u((n + C_v) \bmod N_{zc})$$

$$x_u(i) = e^{-j\frac{\pi u i(i+1)}{N_{zc}}},\ 0 \le i \le N_{zc} - 1,$$

where u is a root index of the ZC sequence, $x_u(i)$ represents one piece of data in an original ZC sequence, $N_{zc}$ is a length of the ZC sequence, $x_{u,v}(n)$ represents one piece of data in a ZC sequence on which cyclic shift processing is performed, and $C_v$ is a cyclic shift; and $$\tilde{y}_{u,v}(n) = y_{u,v}(n) \cdot c(n),\ 0 \le n \le N_{zc} - 1$$

$$y_{u,v}(n) = \sum_{m=0}^{N_{ZC}-1} x_{u,v}(m) \cdot e^{-j\frac{2\pi mn}{N_{ZC}}},$$

where c(n) is an element in the mask sequence, and $\tilde{y}_{u,v}(n)$ represents one piece of data in the frequency domain sequence.

A representation form of the mask sequence may be a pseudo-random sequence, and the mask sequence may include a form such as an m sequence, an M sequence, or a Gold sequence.

Figure 3:
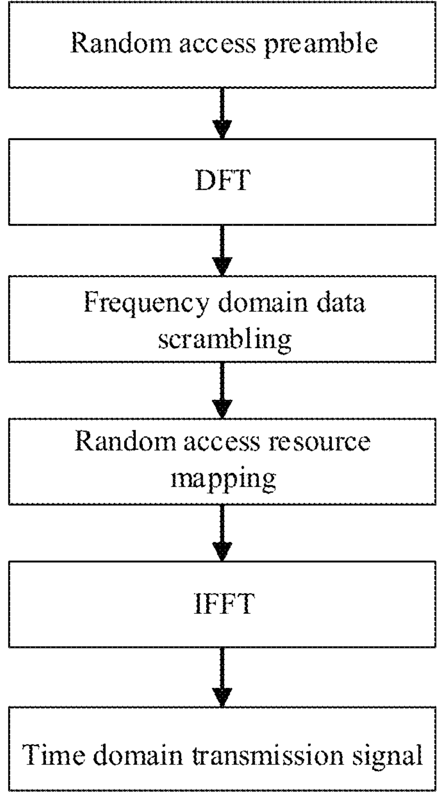
FIG. 3 is a schematic diagram of a sending mechanism of a random access preamble sequence according to an embodiment of this application.

After mapping frequency domain data $\tilde{y}_{u,v}(n)$ of an anti-frequency offset random access preamble sequence to a corresponding subcarrier of a random access time-frequency resource, a user terminal generates a time domain form of the anti-frequency offset random access preamble sequence by using IFFT, and uses the time domain form of the anti-frequency offset random access preamble sequence as uplink synchronization time domain data sent by the terminal. A process of sending the anti-frequency offset preamble sequence is shown in FIG. 3.

Correspondingly, a base station receives the time domain data of the anti-frequency offset random access preamble sequence, and uses the data to perform uplink timing and frequency offset estimation. After estimating and compensating for a fractional normalized subcarrier frequency offset of the received data, the base station needs to complete joint estimation of an uplink synchronization point and an integral normalized subcarrier frequency offset. To reduce processing complexity, when performing time-frequency joint estimation, the base station needs to determine an integral normalized frequency offset range. For example, if a possible maximum residual frequency offset of uplink synchronization is 3.5 kHz, and a subcarrier interval of the random access preamble sequence is 1.25 kHz, the normalized frequency offset range used for detection is limited to [−3, 3]. The base station uses each integral frequency offset within the frequency offset range [−3, 3], to separately perform integral normalized frequency offset compensation on time domain data obtained after fractional normalized frequency offset compensation, converts each group of compensated data into a frequency domain, and extracts $N_{zc}$ subcarriers corresponding to the random access preamble time-frequency resource, so as to recover frequency domain data of the ZC sequence by using a mask corresponding to each subcarrier that is aligned with the preamble time-frequency resource, and perform frequency domain correlation processing. When and only when the integral normalized frequency offset compensation is correct, a unique correlation peak occurs in a corresponding power delay spectrum. Therefore, the base station may simultaneously obtain a timing point and a coarse frequency offset estimation value including fractional and integral normalized subcarrier frequency offsets. A receiving procedure of the anti-frequency offset preamble sequence is shown in an example in FIG. 4-A.

A mask recovery method on the base station side may be shown in an example in FIG. 4-B. Frequency domain resource of the random access preamble is in a mask recovery and local sequence processing window, and the window includes $N_{zc}$ preamble sequence subcarriers. During mask recovery, a local mask sequence c(n) of the base station is aligned one by one with the $N_{zc}$ preamble subcarriers of the frequency domain resource of the random access preamble, and the frequency domain data is recovered in a same mask addition manner as the terminal.

Because the random access preamble sequence in the example has a specific anti-frequency offset function, the random access preamble sequence may also be referred to as an anti-frequency offset random access preamble sequence. That is, the anti-frequency offset random access preamble sequence and the random access preamble sequence may be mixed.

The following describes detection performance of the preamble sequence and a time-frequency joint estimation algorithm designed in this application by using an example. When a random access preamble sequence specified in an LTE/NR protocol has no frequency offset, a conventional uplink synchronization algorithm is used. When the anti-frequency offset preamble sequence proposed in this application has a 2.3-time normalized subcarrier frequency offset, the foregoing time-frequency joint estimation algorithm is used, and the detection performance under an AWGN channel is shown in FIG. 4-C to FIG. 4-G. A timing detection threshold is determined based on a false-alarm probability less than 0.1%. FIG. 4-C shows detection performance of the random access preamble sequence in the LTE/NR protocol by using an example. FIG. 4-D to FIG. 4-G show the detection performance of the anti-frequency offset random access preamble sequence.

Compared with the conventional detection method, performance of the anti-frequency offset preamble detection algorithm decreases by about 2 dB, which is considered to be within an acceptable range. In addition, compared with the conventional detection algorithm, the preamble detection algorithm has no frequency offset range limitation, and a coarse frequency offset estimation result may be additionally obtained.

It can be learned that, compared with the random access preamble sequence specified in the existing LTE/NR protocol, the anti-frequency offset random access preamble sequence proposed in this embodiment is generated by using a mask to scramble the frequency domain data of the ZC sequence. According to the time-frequency joint estimation algorithm in this embodiment, when an integral normalized frequency offset is correctly recovered, correlation of the ZC sequence is not affected. When the integral normalized frequency offset is not recovered, the correlation of the ZC sequence is destroyed. Therefore, when the anti-frequency offset preamble sequence and the time-frequency joint estimation algorithm are used, an impact of the integral normalized carrier frequency offset on uplink synchronization can be eliminated. When uplink synchronization is performed by using the anti-frequency offset preamble sequence and the foregoing algorithm, not only the frequency offset range is not limited in the algorithm, but also uplink timing and a frequency offset estimation value can be obtained at the same time. However, the processing complexity on the base station side increases with an increase in the frequency offset range. In addition, when the preamble sequence and the algorithm in this embodiment are used, the base station may further distinguish a plurality of users that use a same random access time-frequency resource and a same ZC sequence to send preamble sequences with different integral normalized frequency offsets.

The following shows a mask generation method of the anti-frequency offset preamble sequence by using an example.

When the random access preamble sequence is generated on the terminal side, the mask is added to the frequency domain data generated by the ZC sequence, so as to destroy the correlation of the ZC sequence when a received sequence subcarrier and a local sequence subcarrier that are of the base station are not aligned, thereby avoiding an impact of a false peak value in uplink synchronization detection on determining of an uplink timing position.

Considering performance optimization, a sequence with good auto-correlation and cross-correlation needs to be selected as the mask sequence. The mask sequence may select a common pseudo-random sequence form such as an m sequence, an M sequence, or a Gold sequence. Elements in the mask sequence are 1 and −1 or scaled values of 1 and −1.

The mask sequence may be a mask sequence common to an entire network, the sequence is a mask sequence that is of the random access preamble sequence and that is agreed upon by all base stations and terminals, and all the base stations and terminals use a mask sequence including a same element. Alternatively, the mask sequence may be a sequence common to a cell (or a satellite beam), generation of the sequence is related to at least one specific parameter of the cell (or the satellite beam), and the specific parameter of the cell (or the satellite beam) may include, for example, one or more of the following parameters: an index number of the cell (or the satellite beam), an index number of a data subcarrier width, an index number of a bandwidth part (BWP), or an index number of a synchronization signal block (SSB). Alternatively, the mask sequence may be a sequence related to the random access time-frequency resource, generation of the sequence is related to at least one related parameter of the random access time-frequency resource, and the parameter of the random access time-frequency resource includes one or more of the following parameters: a start symbol, a start slot number, a frequency domain resource number, an uplink carrier number, and the like of the time-frequency resource.

When the mask is added to the frequency domain data of the ZC sequence, the frequency domain data is multiplied by the mask, to change a frequency domain data phase. There are a plurality of forms of multiplying the frequency domain data of the ZC sequence by the mask. For example, a real part and an imaginary part of the frequency domain data of the ZC sequence may be multiplied by two different elements $c(2n)$ and $c(2n+1)$ of the mask sequence, or one piece of frequency domain data of the ZC sequence is multiplied, as a whole, by one element $c(n)$ of the mask sequence, or N pieces of frequency domain data of the ZC sequence are multiplied, as a whole, by one element $c(n)$ of the mask sequence.

A form of adding the mask to the frequency domain data on the terminal side is consistent with a form of removing the mask from the frequency domain data on the base station side. A form of adding a mask at a transceiver end may be a manner agreed upon by the terminal and the base station, or may be a manner indicated by the base station. When indicating, the base station needs to transmit indication information of the mask addition form to the terminal by using at least one of broadcast information such as SIB1, OSI, or MIB. The base station may use an index number in an indication form index table shown in FIG. 4-H, to indicate the mask addition form to the terminal. The index table is agreed upon by the terminal and the base station, or is delivered by the base station in the broadcast information.

In a scenario in which a residual frequency offset is relatively small, for example, a residual Doppler frequency offset of a cell (or a satellite beam) with a relatively small elevation is relatively small, or the base station serves a terminal that uses a high-precision crystal oscillator, in this case, a mask function of the random access preamble sequence may not need to be enabled, that is, the random access preamble sequence uses a same generation process as an existing protocol, or all the elements in the mask sequence are considered as 1 or a scaled value of 1. Based on a characteristic of the cell (or the satellite beam) or the served terminal, a configuration function of whether to use the mask of the random access preamble sequence is added as follows: Cell (or satellite beam) level indication parameters may be divided. When the parameters are in a specific interval, a mask scrambling function is not enabled. A parameter division manner is agreed upon by the base station and the terminal, or is delivered by the base station in the broadcast information, where the indication parameters include a Doppler frequency offset value, a common round-trip transmission delay, a common round-trip transmission delay drift, a beam angle, and the like. These indication parameters are parameters corresponding to a reference point in the cell (or the satellite beam), or parameters corresponding to a reference point plus an offset value. Alternatively, one indication mark for enabling a mask may be added to at least one of the broadcast information, RRC information, a MAC element, or DCI, for example, one signaling of whether to enable a mask is added to a RACH configuration signaling of RRC.

For ease of understanding, a specific generation form of the mask sequence of the anti-frequency offset random access preamble sequence is used as an example. A level-31 Gold sequence commonly used in an NR protocol is used as an example, to generate a mask sequence c(n):

$$c(n)=1-2\tilde{c}(n)$$

$$\tilde{c}(n)=(x_1(n+N_c)+x_2(n+N_c))\bmod 2$$

$$x_1(n+31)=(x_1(n+3)+x_i(n))\bmod 2$$

$$x_2(n+31)=(x_2(n+3)+x_2(n+2)+x_2(n+1)+x_2(n))\bmod 2,$$

where $N_c=1600$, and $x_1(0)=1$, $x_1(n)=0$, $n=1, 2, \ldots, 30$; and $x_2(n)$ is an m sequence, and a seed for generating the m sequence is:

$$c_{init}=\sum_{i=0}^{30} x_2(i)\cdot 2^i$$

The mask sequence is a sequence related to parameters of the random access preamble time-frequency resource. For example, the seed of the m sequence included in the mask sequence is obtained by a plurality of time-frequency resource parameters based on a specific operation rule. The parameters related to the seed include a start symbol s_id, a start slot number t_id, a frequency domain resource number fid, an uplink carrier number ul_carrier_id, and the like of the time-frequency resource. A generation manner of the seed of the m sequence is as follows:

$$c_{init}=(2^{17}(14\cdot t\_id+s\_id)+2f\_id+ul\_carried\_id)\bmod 2^{31}$$

The mask sequence c(n) is generated by using the foregoing seed and a Gold sequence generation rule.

The terminal side and the base station side agree to take one piece of frequency domain data of the ZC sequence as a whole to be multiplied by one element c(n) of the mask sequence, and a length of a generated mask sequence is at least $N_{zc}$. After the mask is added to the frequency domain data of the ZC sequence, the frequency domain data is mapped to a corresponding subcarrier of the random access time-frequency resource, and the terminal side generates, by using IFFT, finally sent random access time domain data.

It can be learned that, the foregoing example provides a specific representation form and a generation method of the mask sequence of the anti-frequency offset access preamble. The mask sequence may use different forms of pseudo-random sequences, sequence generation may be related to different parameters, and the frequency domain data of the ZC sequence may further have different mask addition manners. Adding a mask to frequency domain data of an original ZC sequence causes the correlation of the ZC sequence to be destroyed when the received sequence subcarrier and the local sequence subcarrier that are of the base station are not aligned, thereby avoiding an impact of a false correlation peak value in uplink synchronization on determining of the uplink timing position.

The following shows a design method of a basic format of the anti-frequency offset preamble sequence by using an example.

In a satellite communication system, the random access preamble sequence sent by the terminal is affected by both a relatively large residual frequency offset and a round-trip transmission delay (difference). The anti-frequency offset preamble sequence generated in the manner described in the foregoing embodiment has a capability of resisting a residual frequency offset. In addition, a corresponding preamble sequence format needs to be further designed. When a relatively large transmission delay affects the preamble sequence, the base station can still obtain a correct uplink timing position by using the sequence.

For a scenario in which an uplink signal residual frequency offset is relatively large and a user round-trip transmission delay (difference) is relatively small, for example, an under-satellite cell (or a satellite beam), when an impact of the round-trip transmission delay (difference) does not exceed a cyclic prefix length of a preamble sequence format specified in the existing protocol, the terminal can still use the preamble sequence format specified in the existing protocol, and only needs to fill, in a corresponding sequence format, the anti-frequency offset preamble symbol generated in the manner described in the foregoing embodiment.

For a scenario in which the uplink signal includes a specific residual frequency offset and the round-trip transmission delay (difference) is relatively large, for example, an edge cell (or a satellite beam), the round-trip transmission delay (difference) usually exceeds the cyclic prefix length of the preamble sequence format specified in the existing protocol. Therefore, the terminal needs to use a new preamble sequence format and use a new preamble sequence filling manner.

The preamble sequence format is designed, for example, based on a basic time domain format of the random access preamble sequence shown in FIG. 5-A. The random access preamble format should include three parts: a cyclic prefix, a sequence part, and a guard interval. It is assumed that a total length of the preamble sequence is $T_{RA}=T_{CP}+T_{SEQ}+T_{GT}$, a length of the cyclic prefix part is $$T_{CP}=(N_{CP}^i+N_{CP}^f)T_{sym},$$

a natural number $$N_{CP}^i$$

represents an integral quantity of preamble symbols, $$N_{CP}^f$$

represents a fractional quantity of preamble symbols, a range is $$0\le N_{CP}^f<1, \text{ and } T_{sym}$$

is a length of one preamble symbol; a length of the sequence part is $T_{SEQ}=N_{SEQ}T_{sym}$ and $N_{SEQ}$ is a positive integer; and a length of the guard interval part is $T_{GT}$. Herein, the length of the cyclic prefix and the length of the guard interval may be greater than or less than the length $T_{sym}$ of one preamble symbol.

FIG. 5-B to FIG. 5-F show several formats of the preamble sequence by using examples.

For example, the sequence part includes at least one subsequence A. In addition, the sequence part may further include at least one subsequence B. The subsequence A includes at least one preamble symbol, the subsequence B includes at least one preamble symbol, and the preamble symbol included in the subsequence A is different from the preamble symbol included in the subsequence B; and the subsequence A is obtained by performing frequency domain resource mapping and time-frequency transformation on a frequency domain sequence Za, and the frequency domain sequence Za is obtained based on the ZC sequence and the mask sequence.

For example, when lengths of all subsequences A are equal and lengths of all subsequences B are equal, an interval between any two adjacent subsequences B is at least greater than or equal to $$\lceil N_{CP}^{i}+N_{CP}^{f}\rceil,\ \lceil\cdot\rceil$$

represents rounding up, $$N_{CP}^{i}$$

represents an integral quantity of preamble symbols included in the cyclic prefix, and $$N_{CP}^{f}$$

represents a fractional quantity of preamble symbols included in the cyclic prefix.

For example, a length of each subsequence A and a length of each subsequence B are separately greater than or equal to the length of the cyclic prefix.

For example, the random access preamble sequence includes one cyclic prefix.

The subsequence A and the subsequence B are located between the cyclic prefix and the guard interval, or a time domain superimposed sequence of the subsequence A and the subsequence B is located between the cyclic prefix and the guard interval.

For example, the random access preamble sequence includes a first cyclic prefix and a second cyclic prefix.

The at least one subsequence A is located between the first cyclic prefix and the second cyclic prefix, and the at least one subsequence B is located between the second cyclic prefix and the guard interval.

Alternatively, the at least one subsequence B is located between the first cyclic prefix and the second cyclic prefix, and the at least one subsequence A is located between the second cyclic prefix and the guard interval.

Alternatively, the at least one subsequence A and the at least one subsequence B alternately occur between the first cyclic prefix and the second cyclic prefix.

When the length of the cyclic prefix is greater than one preamble symbol, the base station cannot complete uplink timing by using a sequence filled with only one preamble symbol. In this case, the sequence needs to be filled with at least two different preamble symbols. Therefore, a new sequence format and a preamble symbol filling manner need to be designed.

It is assumed that the length of the cyclic prefix in a communication scenario is required to be greater than one preamble symbol, the preamble format needs to be filled with two different preamble symbols α and β, where an anti-frequency offset preamble symbol is recorded as a, and the other preamble symbol is recorded as β. Design of the preamble sequence format is shown in examples in FIG. 5-B to FIG. 5-E.

According to a preamble sequence format design manner shown in FIG. 5-B, a subsequence A shown in FIG. 5-B includes at least one consecutively placed preamble symbol, and the subsequence B includes at least one consecutively placed preamble symbol, where one of the subsequence A or the subsequence B is filled with the anti-frequency offset preamble symbol α, and the other area is filled with the preamble symbol β. Further, the area filled with the anti-frequency offset preamble symbol α includes at least two consecutive preamble symbols.

In a preamble sequence format design manner shown in FIG. 5-C, subsequences A and subsequences B in the figure are alternately placed, where each subsequence A includes at least one consecutively placed preamble symbol, each subsequence B includes at least one consecutively placed preamble symbol, and a quantity of preamble symbols included in each area may be the same or different. One of the subsequence A or the subsequence B is filled with the anti-frequency offset preamble symbol α, and the other area is filled with the preamble symbol β. Further, there is at least one area filled with the anti-frequency offset preamble symbol α includes at least two consecutive preamble symbols. When lengths of all subsequences A are equal and lengths of all subsequences B are equal, all areas filled with the anti-frequency offset preamble symbol α each include at least two consecutive preamble symbols, and an interval between adjacent areas filled with the preamble symbol 13 is at least greater than or equal to $$\lceil N_{CP}^{i}+N_{CP}^{f}\rceil,\ \text{where}\ \lceil\cdot\rceil$$

represents rounding up, that is, a difference between index numbers of start preamble symbols of the two adjacent areas filled with the preamble symbol 13 is greater than or equal to $$\lceil N_{CP}^{i}+N_{CP}^{f}\rceil.$$

For example, if the subsequence B is filled with the anti-frequency offset preamble a, then it is further required that differences between index numbers of start preamble symbols of all adjacent areas A are at least greater than or equal to $$\lceil N_{CP}^{i}+N_{CP}^{f}\rceil,$$

and vice versa.

When one of the subsequence A or the subsequence B is filled with the anti-frequency offset preamble symbol α described in the foregoing embodiment, it is assumed that the symbol is generated from a ZC sequence whose root index is $u_1$ and a corresponding mask sequence, the other area should be filled with the other preamble symbol β different from the anti-frequency offset preamble symbol α. The other preamble symbol β may be generated in a same manner as the anti-frequency offset preamble symbol α. However, at least one of a root index of a ZC sequence or a mask sequence of the preamble symbol β is different from that of the preamble symbol α, that is, the preamble symbol β and the preamble symbol α may use a same ZC sequence and different mask sequences, or use different ZC sequences and a same mask sequence, or use different ZC sequences and different mask sequences. The preamble symbol β may be alternatively in a form of a non-anti-frequency offset preamble, for example, the preamble symbol β is directly filled with the ZC sequence, filled with a pseudo-random number, or this segment of symbol is directly set to be zero.

For ease of understanding, a specific format of the random access preamble is used as an example. FIG. 5-F shows a preamble sequence format that may resist an impact of a relatively large round-trip transmission delay (difference).

It is assumed that the preamble sequence is generated from a ZC sequence whose length is 839, a subcarrier width of the preamble sequence is 1.25 kHz, and the length of one preamble symbol is 0.8 ms. As shown in FIG. 5-F, a cyclic prefix length of the preamble sequence format is 2.284 ms, which is equivalent to 2.855 preamble symbols, that is, the cyclic prefix length of the format is obtained by adding two preamble symbols to a 0.684 ms cyclic prefix of a preamble format 1 specified in the NR protocol. A sequence part includes six preamble symbols, a second symbol, a third symbol, a fifth symbol, and a sixth symbol of the sequence part are filled with the anti-frequency offset preamble symbol α, and a first preamble symbol and a fourth preamble symbol are filled with the other preamble symbol β. Herein, each area filled with the preamble symbol α includes two consecutive preamble symbols, and a difference between index numbers of start preamble symbols of two adjacent areas filled with the preamble symbol β is 3, which meets a requirement of greater than or equal to ⌈r2.855⌉.

In another aspect, the preamble symbol α filled in the preamble sequence format may be generated from a ZC sequence whose root index is U and a mask sequence $c_1(n)$; and the preamble symbol β is generated from a ZC sequence whose root index is U and a mask sequence $c_2$ (n). The preamble symbol α and the preamble symbol β are different symbols from each other.

It can be learned that, the foregoing example provides a preamble sequence format design solution adapted to a scenario in which a round-trip transmission delay (difference) is relatively large. The preamble format is filled with at least two different preamble sequences, so that the base station can detect the uplink timing position of the terminal that sends a preamble sequence of this format, thereby meeting a requirement of the satellite communication system.

FIG. 6-A is a schematic flowchart of a satellite communication method according to an embodiment of this application. The satellite communication method may include the following steps.

601: Receive a random access preamble sequence, where the random access preamble sequence includes a cyclic prefix, a sequence part, and a guard interval, the sequence part is obtained by performing frequency domain resource mapping and time-frequency transformation on a frequency domain sequence, and the frequency domain sequence is obtained based on a ZC sequence and a mask sequence.

602: Perform uplink time-frequency estimation based on the received random access preamble sequence to obtain a frequency offset estimation value $\Delta\hat{f}_2$, where $\Delta\hat{f}_2$ includes a frequency offset caused by a crystal oscillator error and/or a Doppler frequency offset.

603: Send a frequency offset estimation indication to a terminal, where the frequency offset estimation indication is used to indicate the frequency offset estimation value $\Delta\hat{f}_2$.

The frequency offset estimation indication is carried in a frequency offset estimation value feedback field of a media access control random access response MAC RAR; or the frequency offset estimation indication is carried in a random access radio network temporary identifier RA-RNTI.

The following provides some feedback forms of an uplink residual frequency offset estimation value by using examples.

To avoid mutual interference in data transmission between a plurality of users, a base station side should feed back, to the terminal, a residual frequency offset estimation value obtained through initial uplink synchronization, so that the terminal adjusts a frequency offset compensation value, to eliminate a residual frequency offset of a subsequently sent uplink signal. The base station should feed back the frequency offset estimation value to the terminal in the RAR.

A first indication manner of the residual frequency offset estimation value is as follows: adding a field indicating the frequency offset estimation value to the RAR. For example, FIG. 6-B shows a field addition manner. A frequency offset estimation value feedback field whose length is 8 bits is added to the MAC RAR, and the added field is represented in bold font.

A frequency offset value is indicated in an RAR window, and a representation form of the frequency offset value may be an absolute frequency offset value representing a real frequency offset value, or may be a normalized subcarrier frequency offset value proportional to a random access preamble subcarrier or an uplink data subcarrier. The frequency offset value or a scaled value thereof or a specific index number corresponding to the frequency offset value may be directly indicated in the RAR, where a mapping relationship between the index number and the frequency offset value is agreed upon by the base station and the terminal, or is determined by a frequency offset value index table delivered by the base station.

A second indication manner of the residual frequency offset may be as follows: minimizing field occupation in the RAR, and adding an implicit frequency offset indication to the RA-RNTI. For example, a manner of adding the implicit frequency offset indication to the RA-RNTI is as follows:

RA_RNTI=1+*s*_id+14×*t*_id+14×80×*f*_id+14×80×8×ul_carrier_id+14×80×8×2×fre_est_id The part that is not underlined is an RA_RNTI calculation part specified in an NR protocol, and the underlined part is a part in which the implicit frequency offset indication is added. Because the NR protocol specifies that a value range of the RA-RNTI is 0x0001 to 0xFFEF, a value of fre_est_id is 0, 1, or 2. Because there are few values of fre_est_id, only a part of the feedback frequency offset may be included.

Because the value range of fre_est_id is relatively small, fre_est_id may be selected as an indication of an integral normalized subcarrier frequency offset, for example, fre_est_id=0, 1, and 2 respectively represent a frequency offset of −1 integral normalized subcarrier frequency offset, a frequency offset of 0 integral normalized subcarrier frequency offset, and a frequency offset of 1 integral normalized subcarrier frequency offset. Alternatively, fre_est_id may be selected as indications of several integral normalized subcarrier frequency offsets, for example, fre_est_id=0, 1, and 2 respectively represent frequency offsets of −4 integral normalized subcarrier frequency offsets, frequency offsets of 0 integral normalized subcarrier frequency offsets, and frequency offsets of 4 integral normalized subcarrier frequency offsets. A mapping relationship between fre_est_id and the frequency offset value may be agreed upon by the base station and the terminal, or may be indicated by the base station by using at least one of broadcast information such as SIB1, OSI, or MIB. When an indication range of the parameter fre_est_id is insufficient, fre_est_id and the field added to the RAR may be used to jointly indicate the feedback frequency offset estimation value.

When an implicit frequency offset indication form is added to the RA-RNTI, when monitoring the RAR, the terminal side needs to traverse all possible values of fre_est_id, to descramble a PDCCH, and obtain downlink control information included in the PDCCH.

In addition, to maintain normal communication of the terminal at a network connection stage, the base station side may use a frequency offset tracking function to feed back frequency offset tracking or related parameters thereof to the terminal, so that the terminal eliminates the residual frequency offset of the subsequently sent uplink signal.

The base station may choose to feed back, to the terminal, a residual frequency offset estimation value obtained through tracking, where an indication position of the frequency offset estimation value may be user-level RRC information, a MAC element (for example, the frequency offset estimation value is indicated in a MAC element of a transmission timing advance update command), or DCI, and an indication form of the frequency offset estimation value may be an absolute frequency offset value, may be a normalized frequency offset value, may be a scaled value of an absolute frequency offset value or a normalized frequency offset value, or may be an index number of an absolute frequency offset value or a normalized frequency offset value. A mapping relationship between the index number and the frequency offset value may be agreed upon by the base station and the terminal, or delivered by the base station by using at least one of broadcast information such as SIB or MIB. The base station may also indicate a residual frequency offset drift to the terminal. Because a change in the residual frequency offset drift is extremely small, the parameter may be indicated, in at least one of the broadcast information such as SIB or MIB to the terminal, as a cell (or a satellite beam) level parameter, and an indication form of the frequency offset drift may be an absolute frequency offset drift, a normalized frequency offset drift, a scaled value of an absolute frequency offset drift or a normalized frequency offset drift, or an index number of an absolute frequency offset drift or a normalized frequency offset drift. A mapping relationship between the index number and the frequency offset drift may be agreed upon by the base station and the terminal, or delivered by the base station by using at least one of the broadcast information. In addition, because a source of the residual frequency offset may be a Doppler frequency offset, or may be a frequency offset caused by a transceiving crystal oscillator error, the base station side may further use one additional bit to indicate the source of the frequency offset, so that a transmitting party and a receiving party perform corresponding processing. An indication position may be at least one of the broadcast information, or may be the RRC information, the MAC element, or the DCI.

It can be learned that, the foregoing examples provide some residual frequency offset feedback methods. The frequency offset estimation value is directly or indirectly fed back by using the field in the RAR, or the implicit frequency offset indication information is added to the RA-RNTI, so as to indicate all or a part of the frequency offset information. In solutions in the foregoing examples, minimizing overheads of frequency offset feedback is considered, and a feedback manner needs to be flexible.

In general, when uplink synchronization is performed, in the anti-frequency offset preamble sequence in the examples of this embodiment of this application, an impact of a relatively large normalized subcarrier frequency offset can be eliminated, and a related characteristic of the ZC sequence can be retained. According to an uplink synchronization algorithm in this embodiment of this application, a frequency offset range is not limited, and timing and the frequency offset estimation value can be simultaneously obtained. Residual frequency offset feedback in this embodiment of this application may have a plurality of different indication manners, thereby improving flexibility of residual frequency offset feedback.

The following further provides related devices configured to implement the foregoing solutions.

Refer to FIG. 7. An embodiment of this application provides a satellite communication device 700, including: a generation unit 710, configured to generate a random access preamble sequence, where the random access preamble sequence includes a cyclic prefix, a sequence part, and a guard interval, the sequence part is obtained by performing frequency domain resource mapping and time-frequency transformation on a frequency domain sequence, and the frequency domain sequence is obtained based on a ZC sequence and a mask sequence; and an output unit 720, configured to output the random access preamble sequence.

Figures 8, 9:
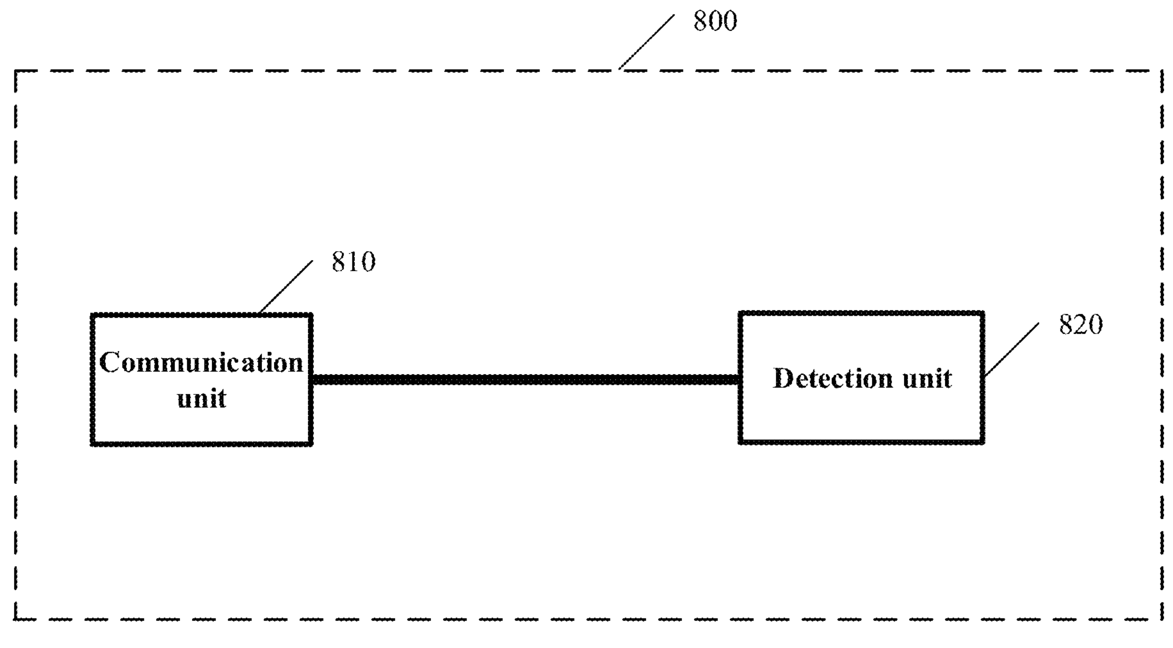
FIG. 8 is another schematic diagram of a structure of a satellite communication device according to an embodiment of this application.
FIG. 9 is another schematic diagram of a structure of a satellite communication device according to an embodiment of this application.

Refer to FIG. 8. An embodiment of this application provides a satellite communication device 800, including:

a communication unit 810, configured to receive a random access preamble sequence, where the random access preamble sequence includes a cyclic prefix, a sequence part, and a guard interval, the sequence part is obtained by performing frequency domain resource mapping and time-frequency transformation on a frequency domain sequence, and the frequency domain sequence is obtained based on a ZC sequence and a mask sequence; and a detection unit 820, configured to perform uplink time-frequency estimation based on the received random access preamble sequence to obtain a frequency offset estimation value $\Delta\hat{f}_2$, where $\Delta\hat{f}_2$ includes a frequency offset caused by a crystal oscillator error and/or a Doppler frequency offset.

The communication unit 810 is further configured to send a frequency offset estimation indication to a terminal, where the frequency offset estimation indication is used to indicate the frequency offset estimation value $\Delta\hat{f}_2$.

For example, the frequency offset estimation indication is carried in a frequency offset estimation value feedback field of a media access control random access response MAC RAR; or the frequency offset estimation indication is carried in a random access radio network temporary identifier RA-RNTI.

Refer to FIG. 9. An embodiment of this application further provides a satellite communication device 900 (a satellite communication device 900 such as a terminal device, a ground base station, or a satellite). The satellite communication device 900 may include a processor 910 and a memory 920 that are coupled to each other. The processor is configured to invoke a computer program stored in the memory, to perform some or all of the steps of any method provided in the embodiments of this application.

An embodiment of this application further provides a computer-readable storage medium, where the computer-readable storage medium stores a computer program, and the computer program is executed by a processor, to complete some or all of the steps of any method provided in the embodiments of this application.

An embodiment of this application further provides a computer program product including instructions. When the computer program product is run on a user equipment, a satellite communication device may be enabled to perform some or all of the steps of any method provided in the embodiments of this application.

Figure 10:
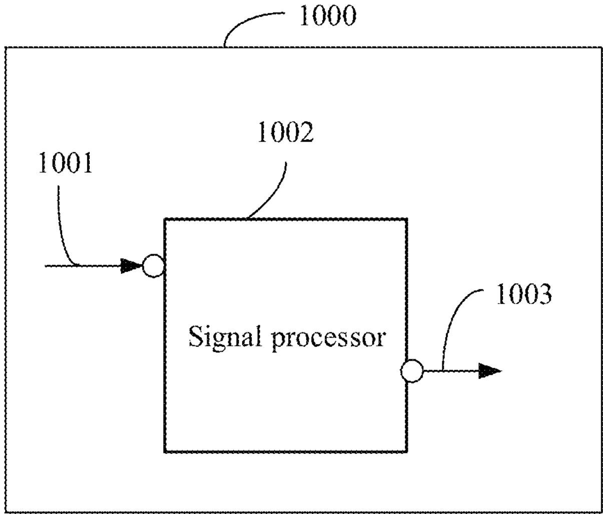
FIG. 10 is another schematic diagram of a structure of a satellite communication device according to an embodiment of this application.

Refer to FIG. 10. An embodiment of this application further provides a communication apparatus 1000, including an input interface circuit 1001, a signal processor 1002, and an output interface circuit 1003. The signal processor 1002 is configured to perform some or all of the steps of any method provided in the embodiments of this application.

Figure 11:
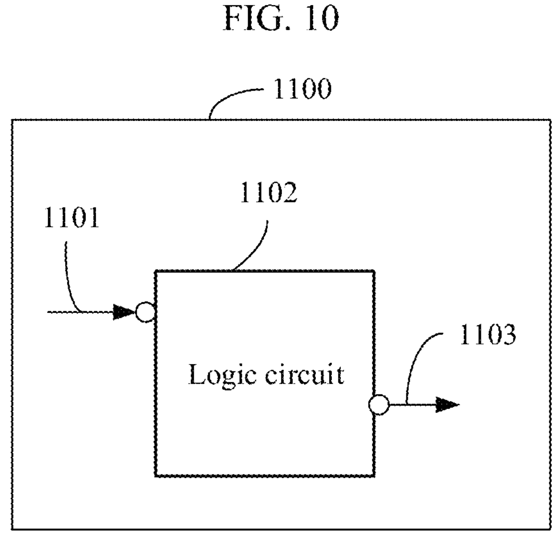
FIG. 11 is another schematic diagram of a structure of a satellite communication device according to an embodiment of this application.

Refer to FIG. 11. An embodiment of this application further provides a communication apparatus 1100, including at least one input end 1101, a logic circuit 1102, and at least one output end 1103. The logic circuit 1102 is configured to perform some or all of the steps of any method provided in the embodiments of this application.

An embodiment of this application further provides a computer-readable storage medium. The computer-readable storage medium stores a computer program, and the computer program is executed by hardware (for example, a processor), to perform some or all of the steps of any method performed by any device in embodiments of this application.

An embodiment of this application further provides a computer program product including instructions. When the computer program product is run on a computer device, the computer device is enabled to perform some or all of the steps of any method in the foregoing aspects.

All or some of foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like.

In the foregoing embodiments, the descriptions of embodiments have respective focuses. For a part that is not described in detail in an embodiment, refer to related descriptions in other embodiments.

In several embodiments provided in this application, it should be understood that the disclosed apparatus may alternatively be implemented in other manners. For example, the described apparatus embodiment is merely an example. For example, the unit division is merely logical function division or may be other division during actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

The units described as separate parts may or may not be physically separate. Parts displayed as units may or may not be physical units, that is, may be located at one position or may be distributed on a plurality of network units. Some or all units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or a part contributing to a conventional technology, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A satellite communication method, comprising:

generating a random access preamble sequence, wherein the random access preamble sequence comprises a cyclic prefix, a sequence part, and a guard interval, wherein the sequence part is obtained by performing frequency domain resource mapping and time-frequency transformation on a frequency domain sequence, and the frequency domain sequence is obtained based on a Zadoff-Chu (ZC) sequence and a mask sequence; and outputting the random access preamble sequence, wherein in response to the mask sequence being a sequence common to a cell or satellite beam, generation of the mask sequence is related to at least one parameter of the cell or satellite beam, and the at least one parameter of the cell or satellite beam comprises at least one of an index number of the cell or satellite beam, an index number of a data subcarrier width, an index number of a synchronization signal block, or an index number of a bandwidth part, wherein the sequence part comprises at least one subsequence A and at least one subsequence B, the subsequence A comprises at least one first preamble symbol, the subsequence B comprises at least one second preamble symbol, and the at least one first preamble symbol comprised in the subsequence A is different from the at least one second preamble symbol comprised in the subsequence B;

the subsequence A is obtained by performing frequency domain resource mapping and time-frequency transformation on a frequency domain sequence Za, and the frequency domain sequence Za is obtained based on the ZC sequence and the mask sequence; and when the cyclic prefix comprises a first cyclic prefix and a second cyclic prefix:

the at least one subsequence A is located between the first cyclic prefix and the second cyclic prefix, and the at least one subsequence B is located between the second cyclic prefix and the guard interval;

the at least one subsequence B is located between the first cyclic prefix and the second cyclic prefix, and the at least one subsequence A is located between the second cyclic prefix and the guard interval; or the at least one subsequence A and the at least one subsequence B alternately occur between the first cyclic prefix and the second cyclic prefix.

2. The method according to claim 1, wherein $$x_{u,v}(n) = x_u((n + C_v) \bmod N_{zc})$$

$$x_u(i) = e^{-j\frac{\pi u i(i+1)}{N_{zc}}},\ 0 \le i \le N_{zc} - 1,$$

wherein u is a root index of the ZC sequence, $x_u(i)$ represents one piece of data in an original ZC sequence, $N_{zc}$ is a length of the ZC sequence, $x_{u,v}(n)$ represents one piece of data in a ZC sequence on which cyclic shift processing is performed, and $C_v$ is a cyclic shift; and $$\tilde{y}_{u,v}(n) = y_{u,v}(n) \cdot c(n),\ 0 \le n \le N_{zc} - 1$$

$$y_{u,v}(n) = \sum_{m=0}^{N_{ZC}-1} x_{u,v}(m) \cdot e^{-j\frac{2\pi mn}{N_{ZC}}},$$

wherein c(n) is an element in the mask sequence, and $\tilde{y}_{u,v}(n)$ represents one piece of data in the frequency domain sequence.

3. The method according to claim 1, wherein the mask sequence is an m sequence or a Gold sequence, and elements in the mask sequence are 1 and −1 or scaled values of 1 and −1.

4. The method according to claim 1, wherein in response to the mask sequence being a sequence common to an entire network, the mask sequence is a mask sequence of the random access preamble sequence and is agreed upon by all base stations and terminals, and all the base stations and terminals use a mask sequence comprising a same element; or wherein in response to the mask sequence being a sequence related to a random access time-frequency resource, generation of the mask sequence is related to at least one parameter of the random access time-frequency resource, and the at least one parameter of the random access time-frequency resource comprises at least one of a start symbol, a start slot number, a frequency domain resource number, or an uplink carrier number of the random access time-frequency resource.

5. The method according to claim 1, wherein when lengths of all subsequences A are equal and lengths of all subsequences B are equal, an interval between any two adjacent subsequences B is at least greater than or equal to $$\lceil N_{CP}^i + N_{CP}^f \rceil,\ \lceil \bullet \rceil$$

represents rounding up, $$N_{CP}^i$$

represents an integral quantity of preamble symbols comprised in the cyclic prefix, and $$N_{CP}^f$$

represents a fractional quantity of preamble symbols comprised in the cyclic prefix.

6. The method according to claim 1, wherein a length of each subsequence A and a length of each subsequence B are separately greater than or equal to a length of the cyclic prefix.

7. The method according to claim 6, when the random access preamble sequence comprises one cyclic prefix:

the subsequence A and the subsequence B are located between the cyclic prefix and the guard interval, or a time domain superimposed sequence of the subsequence A and the subsequence B is located between the cyclic prefix and the guard interval.

8. A satellite communication apparatus, comprising:

at least one processor; and at least one non-transitory memory coupled to the at least one processor and storing computer program instructions for execution by the at least one processor to:

generate a random access preamble sequence, wherein the random access preamble sequence comprises a cyclic prefix, a sequence part, and a guard interval, the sequence part is obtained by performing frequency domain resource mapping and time-frequency transformation on a frequency domain sequence, and the frequency domain sequence is obtained based on a Zadoff-Chu (ZC) sequence and a mask sequence; and output the random access preamble sequence, wherein in response to the mask sequence being a sequence common to a cell or satellite beam, generation of the mask sequence is related to at least one parameter of the cell or satellite beam, and the at least one parameter of the cell or satellite beam comprises at least one of an index number of the cell or satellite beam, an index number of a data subcarrier width, an index number of a synchronization signal block, or an index number of a bandwidth part, wherein the sequence part comprises at least one subsequence A and at least one subsequence B, the subsequence A comprises at least one first preamble symbol, the subsequence B comprises at least one second preamble symbol, and the at least one first preamble symbol comprised in the subsequence A is different from the at least one second preamble symbol comprised in the subsequence B;

the subsequence A is obtained by performing frequency domain resource mapping and time-frequency transformation on a frequency domain sequence Za, and the frequency domain sequence Za is obtained based on the ZC sequence and the mask sequence; and when the cyclic prefix comprises a first cyclic prefix and a second cyclic prefix:

the at least one subsequence A is located between the first cyclic prefix and the second cyclic prefix, and the at least one subsequence B is located between the second cyclic prefix and the guard interval;

the at least one subsequence B is located between the first cyclic prefix and the second cyclic prefix, and the at least one subsequence A is located between the second cyclic prefix and the guard interval; or the at least one subsequence A and the at least one subsequence B alternately occur between the first cyclic prefix and the second cyclic prefix.

9. The apparatus according to claim 8, wherein $$x_{u,v}(n) = x_u((n + C_v) \bmod N_{zc})$$

$$x_u(i) = e^{-j\frac{\pi u i(i+1)}{N_{zc}}},\ 0 \le i \le N_{zc} - 1,$$

wherein u is a root index of the ZC sequence, $x_u(i)$ represents one piece of data in an original ZC sequence, $N_{zc}$ is a length of the ZC sequence, $x_{u,v}(n)$ represents one piece of data in a ZC sequence on which cyclic shift processing is performed, and $C_v$ is a cyclic shift; and $$\tilde{y}_{u,v}(n) = y_{u,v}(n) \cdot c(n),\ 0 \le n \le N_{zc} - 1$$

$$y_{u,v}(n) = \sum_{m=0}^{N_{ZC}-1} x_{u,v}(m) \cdot e^{-j\frac{2\pi mn}{N_{ZC}}},$$

wherein c(n) Is an element in the mask sequence, and $\tilde{y}_{u,v}(n)$ represents one piece of data in the frequency domain sequence.

10. The apparatus according to claim 8, wherein the mask sequence is an m sequence or a Gold sequence, and elements in the mask sequence are 1 and −1 or scaled values of 1 and −1.

11. The apparatus according to claim 8, wherein in response to the mask sequence being a sequence common to an entire network, the mask sequence is a mask sequence of the random access preamble sequence and is agreed upon by all base stations and terminals, and all the base stations and terminals use a mask sequence comprising a same element; or wherein in response to the mask sequence being a sequence related to a random access time-frequency resource, generation of the mask sequence is related to at least one parameter of the random access time-frequency resource, and the at least one parameter of the random access time-frequency resource comprises at least one of a start symbol, a start slot number, a frequency domain resource number, or an uplink carrier number of the random access time-frequency resource.

12. The apparatus according to claim 8, wherein when lengths of all subsequences A are equal and lengths of all subsequences B are equal, an interval between any two adjacent subsequences B is at least greater than or equal to $$\lceil N_{CP}^{i} + N_{CP}^{f} \rceil,\ \lceil \cdot \rceil$$

represents rounding up, $$N_{CP}^{i}$$

represents an integral quantity of preamble symbols comprised in the cyclic prefix, and $$N_{CP}^{f}$$

represents a fractional quantity of preamble symbols comprised in the cyclic prefix.

13. The apparatus according to claim 8, wherein a length of each subsequence A and a length of each subsequence B are separately greater than or equal to a length of the cyclic prefix.

14. The apparatus according to claim 13, when the random access preamble sequence comprises one cyclic prefix:

the subsequence A and the subsequence B are located between the cyclic prefix and the guard interval, or a time domain superimposed sequence of the subsequence A and the subsequence B is located between the cyclic prefix and the guard interval.

15. The method according to claim 1, wherein the subsequence A comprises at least two consecutively placed preamble symbols.

16. The method according to claim 1, wherein the subsequence B is obtained by using a same ZC sequence as the subsequence A and a different mask sequence from the subsequence A; or the subsequence B is obtained by using a different ZC sequence from the subsequence A; or the subsequence B is directly filled with the ZC sequence, filled with a pseudorandom number, or set to be zero.

17. The apparatus according to claim 8, wherein the subsequence A comprises at least two consecutively placed preamble symbols.

18. The apparatus according to claim 8, wherein the subsequence B is obtained by using a same ZC sequence as the subsequence A and a different mask sequence from the subsequence A; or the subsequence B is obtained by using a different ZC sequence from the subsequence A; or the subsequence B is directly filled with the ZC sequence, filled with a pseudorandom number, or set to be zero.

* * * * *